US012641478B2

(12) United States Patent
      Fujishiro et al.

(10) Patent No.:      US 12,641,478 B2
(45) Date of Patent:          May 26, 2026

(54) COMMUNICATION CONTROL METHOD

(71) Applicant: KYOCERA Corporation, Kyoto (JP)

(72) Inventors: Masato Fujishiro, Yokohama (JP);
                Henry Chang, San Diego, CA (US)

(73) Assignee: KYOCERA Corporation, Kyoto (JP)

( * ) Notice:      Subject to any disclaimer, the term of this
                   patent is extended or adjusted under 35
                   U.S.C. 154(b) by 296 days.

(21) Appl. No.: 18/474,494

(22) Filed:      Sep. 26, 2023

(65)                 Prior Publication Data
        US 2024/0015580 A1        Jan. 11, 2024

Related U.S. Application Data

(63) Continuation        of        application        No.
     PCT/JP2022/013269, filed on Mar. 22, 2022.

(60) Provisional application No. 63/166,507, filed on Mar.
     26, 2021.

(51) Int. Cl.
     *H04W 28/02*          (2009.01)
(52) U.S. Cl.
     CPC .............................. *H04W 28/0278* (2013.01)
(58) Field of Classification Search
     CPC .................................................. H04W 28/0278
     See application file for complete search history.

(56)                 References Cited

U.S. PATENT DOCUMENTS

2021/0076404 A1*    3/2021   Tsai ...................... H04W 72/23
2021/0153176 A1*    5/2021   Lee .......................... H04W 4/40

2021/0250804 A1*    8/2021   Chen ...................... H04W 72/52
2021/0360534 A1*   11/2021   Wei ....................... H04W 52/242
2022/0109486 A1*    4/2022   Fu .......................... H04L 5/0044
2022/0386320 A1*   12/2022   Fujishiro ............... H04W 16/26
2023/0103455 A1*    4/2023   Baek ................... H04W 72/231
                                                          370/329
2023/0388884 A1*   11/2023   Freda ................ H04W 36/0085

OTHER PUBLICATIONS

3rd Generation Partnership Project; Technical Specification Group
Radio Access Network; NR; NR and NG-RAN Overall Description;
Stage 2 (Release 16); 3GPP TS 38.300 V16.4.0; Dec. 2020; pp.
1-149.
Kyocera; Remaining issue of pre-emptive BSR in IAB; 3GPP
TSG-RAN WG2 #109-e; R2-2000514; Online; Feb. 24-Mar. 6,
2020; pp. 1-7.
Qualcomm Incorporated; Interruption time reduction for Intra-
donor IAB-node Migration; 3GPP TSG-RAN WG3 Meeting #110-
e; R3-206257; E-meeting; Nov. 2-12, 2020; pp. 1-9.

(Continued)

*Primary Examiner* — Ajay Cattungal
(74) *Attorney, Agent, or Firm* — Studebaker Brackett
PLLC

(57)                    ABSTRACT

In a first aspect, a communication control method is used in
a cellular communication system. The communication con-
trol method includes transmitting, by a donor base station
with a first relay node and a second relay node as lower
nodes of the donor base station, a trigger type for a pre-
emptive buffer status report (pre-emptive BSR) to the sec-
ond relay node being a parent node of the first relay node.
The communication control method includes triggering, by
the first relay node, the pre-emptive buffer status report to
the second relay node in accordance with the trigger type.

4 Claims, 22 Drawing Sheets

(56)               References Cited

OTHER PUBLICATIONS

ITRI; Trigger Conditions for low-latency IAB Uplink Scheduling; 3GPP TSG-RAN WG2 Meeting #108; R2-1915068; Reno, USA; Nov. 18-22, 2019; pp. 1-6.

Kyocera; Possible solutions for topology-wide fairness, multi-hop latency and congestion mitigation in eIAB; 3GPP TSG-RAN WG2 #114-e; R2-2105509; Online; May 19-27, 2021; pp. 1-9.

\* cited by examiner

Pre-emptive BSR MAC CE

START — S10

DONOR NODE CONFIGURES CHILD NODE
WITH TRIGGER TYPE FOR PRE-EMPTIVE BSR — S11

DONOR NODE CONFIGURES PARENT NODE
WITH TRIGGER TYPE FOR PRE-EMPTIVE BSR
CONFIGURED FOR CHILD NODE — S12

CHILD NODE TRIGGERS PRE-EMPTIVE BSR
TO PARENT NODE IN ACCORDANCE WITH
TRIGGER TYPE — S13

PARENT NODE PERFORMS SCHEDULING
OF RADIO RESOURCES — S14

END — S15

```
MAC-CellGroupConfig ::=              SEQUENCE {
[...]
   usePreBSR-r16                     ENUMERATED {true}
[...]
```

| *MAC-CellGroupConfig* field descriptions |
|---|
| *usePreBSR* |
| If set to true, the MAC entity of the IAB-MT may use the Pre-emptive BSR. |

START — S50

DONOR NODE CONFIGURES CHILD NODE WITH PERMISSION FOR DYNAMIC TRIGGER DECISION — S51

CHILD NODE ITSELF DECIDES TRIGGER TYPE AND TRIGGERS PRE-EMPTIVE BSR — S52

PARENT NODE PERFORMS SCHEDULING OF RADIO RESOURCES — S53

END — S54

START — S60

DONOR NODE CONFIGURES PARENT NODE WITH TRIGGER TYPE TO BE USED BY CHILD NODE — S61

PARENT NODE NOTIFIES CHILD NODE OF TRIGGER TYPE — S62

CHILD NODE TRIGGERS PRE-EMPTIVE BSR TO PARENT NODE — S63

PARENT NODE PERFORMS SCHEDULING OF RADIO RESOURCES — S64

END — S65

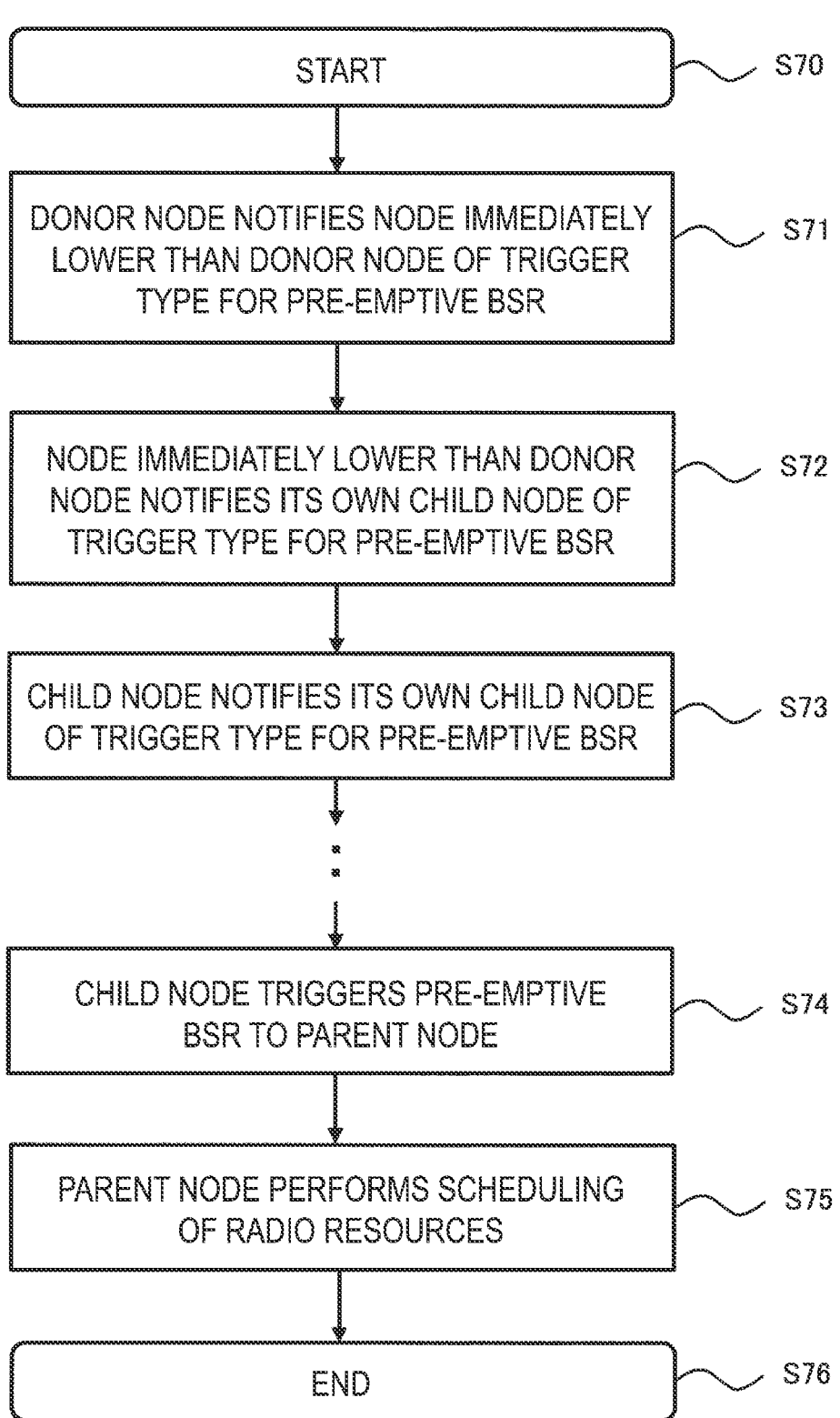

START — S70

DONOR NODE NOTIFIES NODE IMMEDIATELY LOWER THAN DONOR NODE OF TRIGGER TYPE FOR PRE-EMPTIVE BSR — S71

NODE IMMEDIATELY LOWER THAN DONOR NODE NOTIFIES ITS OWN CHILD NODE OF TRIGGER TYPE FOR PRE-EMPTIVE BSR — S72

CHILD NODE NOTIFIES ITS OWN CHILD NODE OF TRIGGER TYPE FOR PRE-EMPTIVE BSR — S73

CHILD NODE TRIGGERS PRE-EMPTIVE BSR TO PARENT NODE — S74

PARENT NODE PERFORMS SCHEDULING OF RADIO RESOURCES — S75

END — S76

FIG. 22

COMMUNICATION CONTROL METHOD

RELATED APPLICATIONS

The present application is a continuation based on PCT Application No. PCT/JP2022/013269, filed on Mar. 22, 2022, which claims the benefit of US Provisional Patent Application No. 63/166,507 filed on Mar. 26, 2021. The content of which is incorporated by reference herein in their entirety.

TECHNICAL FIELD

The present disclosure relates to a communication control method used in a cellular communication system.

BACKGROUND OF INVENTION

In the Third Generation Partnership Project (3GPP), which is a project for the standardization of cellular communication systems, introducing a new relay node referred to as an Integrated Access and Backhaul (IAB) node (for example, see "3GPP TS 38.300 V16.4.0 (2020-12)") is being considered. One or more relay nodes are involved in communication between a base station and a user equipment and perform relay for the communication.

SUMMARY

In a first aspect, a communication control method is used in a cellular communication system. The communication control method includes transmitting, by a donor base station with a first relay node and a second relay node as lower nodes of the donor base station, a trigger type for a pre-emptive buffer status report (pre-emptive BSR) to the second relay node being a parent node of the first relay node. The communication control method includes triggering, by the first relay node, the pre-emptive buffer status report to the second relay node in accordance with the trigger type.

In a second aspect, a communication control method is used in a cellular communication system. The communication control method includes transmitting, by a second relay node being a parent node of a first relay node, a trigger type for a pre-emptive buffer status report (pre-emptive BSR) to the first relay node. The communication control method includes triggering, by the first relay node, the pre-emptive buffer status report to the second relay node in accordance with the trigger type.

In a third aspect, a communication control method is used in a cellular communication system. The communication control method includes transmitting, by a first relay node being a child node of a second relay node, a trigger type for a pre-emptive buffer status report (pre-emptive BSR) to the second relay node. The communication control method includes triggering, by the first relay node, the pre-emptive buffer status report to the second relay node in accordance with the trigger type.

In a fourth aspect, a communication control method is used in a cellular communication system. The communication control method includes transmitting, by a donor base station with a plurality of relay nodes as lower nodes of the donor base station, a trigger type for a pre-emptive buffer status report (pre-emptive BSR) to a first relay node immediately lower than the donor base station, transmitting, by the first relay node, the trigger type to a second relay node being a child node of the first relay node, and repeating the transmitting of the trigger type to the first relay node and the transmitting of the trigger type to the second relay node for all of the plurality of relay nodes being lower nodes of the donor base station. The communication control method includes triggering, by each of the all of the plurality of relay nodes, the pre-emptive buffer status report in accordance with the trigger type.

BRIEF DESCRIPTION OF THE DRAWINGS

FIG. 22 is a diagram illustrating an operation example according to the fifth embodiment.

DESCRIPTION OF EMBODIMENTS

A cellular communication system according to an embodiment is described with reference to the drawings. In the description of the drawings, the same or similar parts are denoted by the same or similar reference signs.

Configuration of Cellular Communication System

First, a configuration example of the cellular communication system according to an embodiment will be described. In an embodiment, a cellular communication system 1 is a 3GPP system. Specifically, a radio access scheme in the cellular communication system 1 is New Radio (NR) being a 5G radio access scheme. Note that Long Term Evolution (LTE) may be at least partially applied to the cellular communication system. A future cellular communication system such as 6G may be applied to the cellular communication system.

Figure 1:
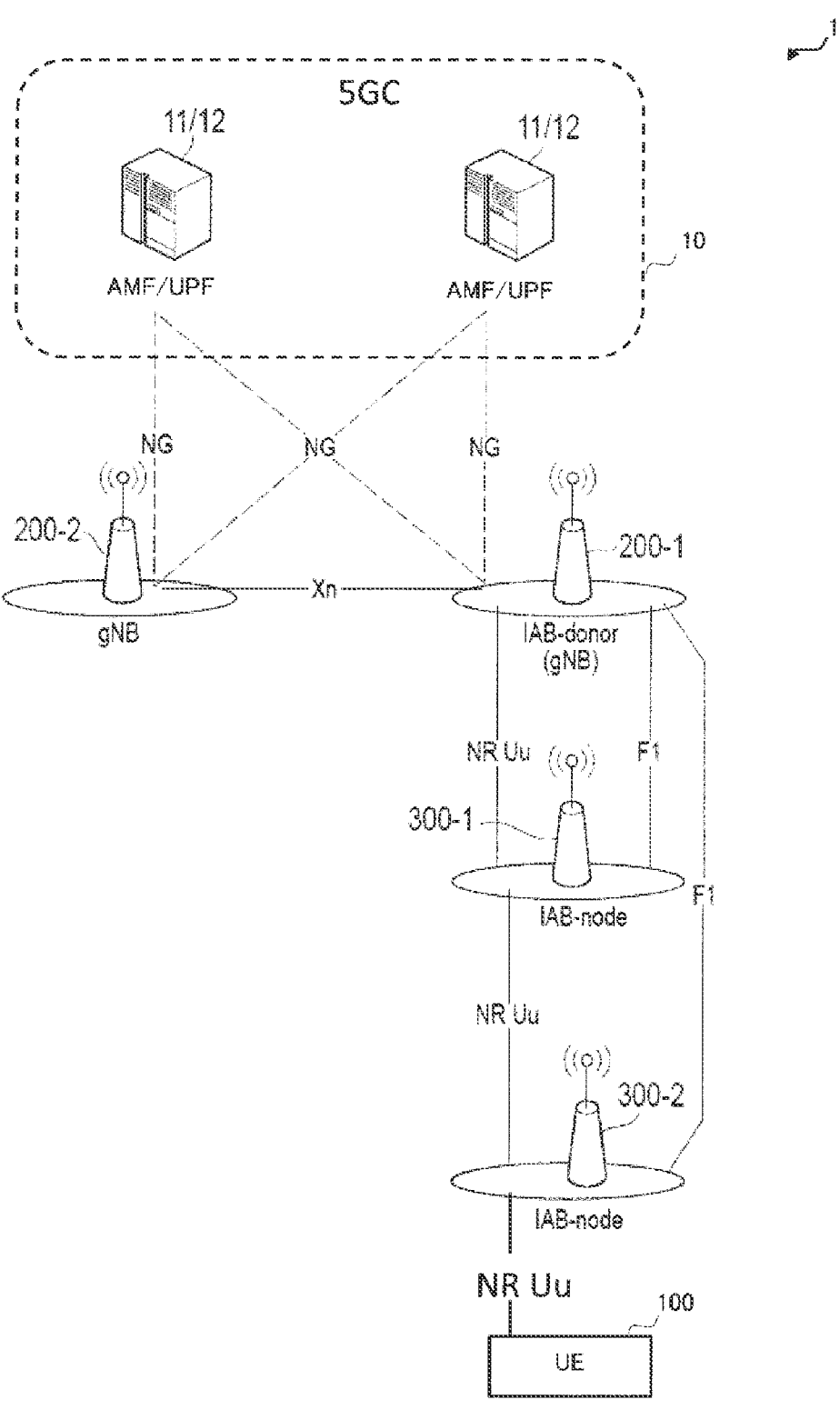
FIG. 1 is a diagram illustrating a configuration example of a cellular communication system according to an embodiment.

FIG. 1 is a diagram illustrating a configuration example of the cellular communication system 1 according to an embodiment.

As illustrated in FIG. 1, the cellular communication system 1 includes a 5G core network (5GC) 10, a User Equipment (UE) 100, base station apparatuses (hereinafter, also referred to as base stations in some cases) 200-1 and 200-2, and IAB nodes 300-1 and 300-2. The base station 200 may be referred to as a gNB.

An example in which the base station 200 is an NR base station is mainly described below, but the base station 200 may also be an LTE base station (i.e., an eNB).

Note that hereinafter, the base stations 200-1 and 200-2 may be referred to as a gNB 200 (or the base station 200 in some cases), and the IAB nodes 300-1 and 300-2 may be referred to as an IAB node 300.

The 5GC 10 includes an Access and Mobility Management Function (AMF) 11 and a User Plane Function (UPF) 12. The AMF 11 is an apparatus that performs various types of mobility controls and the like for the UE 100. The AMF 11 communicates with the UE 100 by using Non-Access Stratum (NAS) signaling, and thereby manages information of an area in which the UE 100 exists. The UPF 12 is an apparatus that performs transfer control of user data and the like.

Each gNB 200 is a fixed wireless communication node and manages one or more cells. The term "cell" is used to indicate a minimum unit of a wireless communication area. The term "cell" may be used to indicate a function or a resource for performing wireless communication with the UE 100. Hereinafter, a "cell" may be used without being distinguished from a base station such as the gNB 200. One cell belongs to one carrier frequency.

Each gNB 200 is interconnected to the 5GC 10 via an interface referred to as an NG interface. FIG. 1 illustrates a gNB 200-1 and a gNB 200-2 that are connected to the 5GC 10.

Each gNB 200 may be divided into a Central Unit (CU) and a Distributed Unit (DU). The CU and the DU are interconnected via an interface referred to as an F1 interface. An F1 protocol is a communication protocol between the CU and the DU and includes an F1-C protocol that is a control plane protocol and an F1-U protocol that is a user plane protocol.

The cellular communication system 1 supports an IAB that uses NR for the backhaul to enable wireless relay of the NR access. The donor gNB (or the donor node, hereinafter also referred to as the "donor node" in some cases) 200-1 is a donor base station that is a terminal node of the NR backhaul on the network side and includes additional functions for supporting the IAB. The backhaul can implement multi-hop via a plurality of hops (i.e., a plurality of IAB nodes 300).

FIG. 1 illustrates an example in which the IAB node 300-1 is wirelessly connected to the donor node 200-1, the IAB node 300-2 is wirelessly connected to the IAB node 300-1, and the F1 protocol is transmitted in two backhaul hops.

The UE 100 is a mobile wireless communication apparatus that performs wireless communication with the cells. The UE 100 may be any type of apparatus as long as the UE 100 is an apparatus that performs wireless communication with the gNB 200 or the IAB node 300. For example, the UE 100 is a mobile phone terminal, a tablet terminal, a notebook PC, a sensor or an apparatus provided in the sensor, and/or a vehicle or an apparatus provided in the vehicle. The UE 100 is wirelessly connected to the IAB node 300 or the gNB 200 via an access link. FIG. 1 illustrates an example in which the UE 100 is wirelessly connected to the IAB node 300-2. The UE 100 indirectly communicates with the donor node 200-1 via the IAB node 300-2 and the IAB node 300-1.

Figure 2:
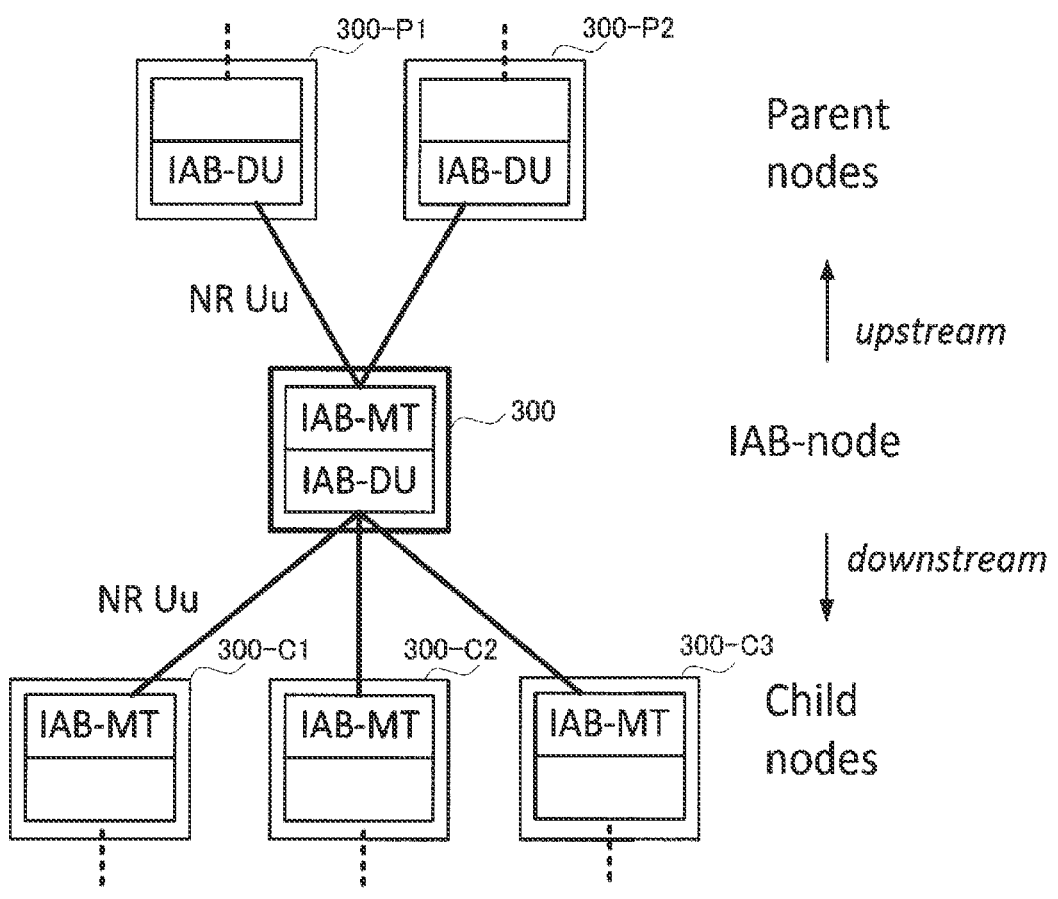
FIG. 2 is a diagram illustrating a relationship between an IAB node, Parent nodes, and Child nodes.

FIG. 2 is a diagram illustrating a relationship between the IAB node 300, Parent nodes, and Child nodes.

As illustrated in FIG. 2, each IAB node 300 includes an IAB-DU corresponding to a base station functional unit and an IAB-Mobile Termination (MT) corresponding to a user equipment functional unit.

Neighboring nodes of the IAB-MT (i.e., upper node) of an NR Uu wireless interface are referred to as "parent nodes". The parent node is the DU of a parent IAB node or the donor node 200. A radio link between the IAB-MT and each parent node is referred to as a backhaul link (BH link). FIG. 2 illustrates an example in which the parent nodes of the IAB node 300 are IAB nodes 300-P1 and 300-P2. Note that the direction toward the parent nodes is referred to as upstream. As viewed from the UE 100, the upper nodes of the UE 100 can correspond to the parent nodes.

Neighboring nodes of the IAB-DU (i.e., lower nodes) of an NR access interface are referred to as "child nodes". The IAB-DU manages cells in a manner the same as, and/or similar to the gNB 200. The IAB-DU terminates the NR Uu wireless interface connected to the UE 100 and the lower IAB nodes. The IAB-DU supports the F1 protocol for the CU of the donor node 200-1. FIG. 2 illustrates an example in which the child nodes of the IAB node 300 are IAB nodes 300-C1 to 300-C3; however, the UE 100 may be included in the child nodes of the IAB node 300. Note that the direction toward the child nodes is referred to as downstream.

All of the IAB nodes 300 connected to the donor node 200 via one or more hops form a Directed Acyclic Graph (DAG) topology (which may be referred to as the "topology" below) rooted at the donor node 200. In this topology, the neighboring nodes of the IAB-DU in the interface are child nodes, and the neighboring nodes of the IAB-MT in the interface are parent nodes as illustrated in FIG. 2. The donor node 200 performs, for example, centralized management on resources, topology, and routes of the IAB topology. The donor node 200 is a gNB that provides network access to the UE 100 via a network of backhaul links and access links.

Configuration of Base Station

Figure 3:
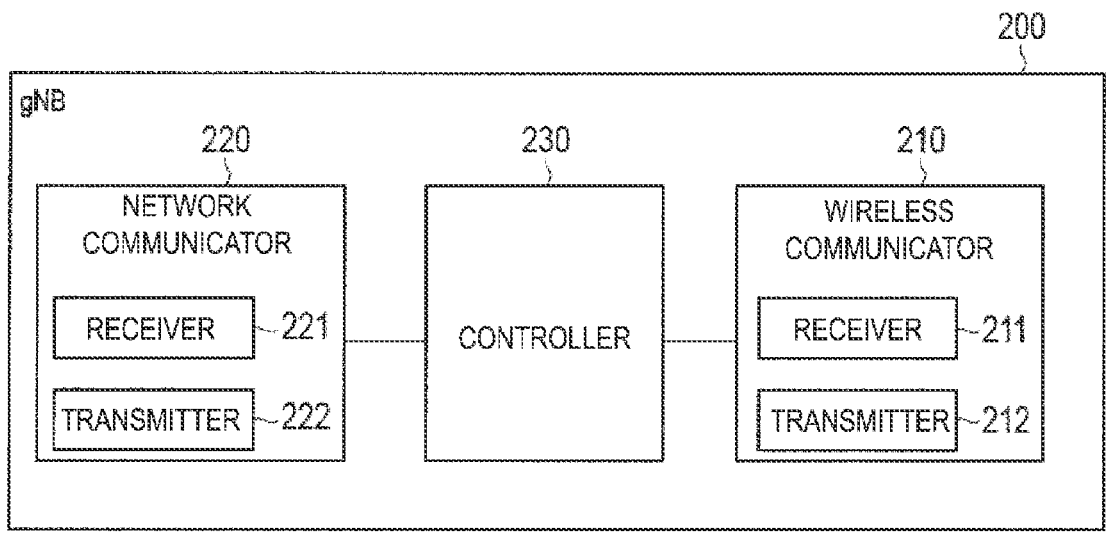
FIG. 3 is a diagram illustrating a configuration example of a gNB (base station) according to an embodiment.

A configuration of the gNB 200 that is a base station according to the embodiment is described. FIG. 3 is a diagram illustrating a configuration example of the gNB 200. As illustrated in FIG. 3, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212.

The receiver 211 performs various types of reception under control of the controller 230. The receiver 211 includes an antenna and converts (down-converts) a radio signal received by the antenna into a baseband signal (reception signal), and outputs the baseband signal to the controller 230. The transmitter 212 performs various types of transmission under control of the controller 230. The transmitter 212 includes an antenna and converts (up-converts) the baseband signal (transmission signal) output by the controller 230 into a radio signal, and transmits the radio signal from the antenna.

The network communicator 220 performs wired communication (or wireless communication) with the 5GC 10 and performs wired communication (or wireless communication) with another neighboring gNB 200. The network communicator 220 includes a receiver 221 and a transmitter 222. The receiver 221 performs various types of reception under control of the controller 230. The receiver 221 receives a signal from an external source and outputs the reception signal to the controller 230. The transmitter 222 performs various types of transmission under control of the controller 230. The transmitter 222 transmits the transmission signal output by the controller 230 to an external destination.

The controller 230 performs various types of controls for the gNB 200. The controller 230 includes at least one memory and at least one processor electrically connected to the memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing. The processor performs processing of the layers described below. In each example described below, the controller 230 may perform each processing operation in the gNB 200 (or the donor node 200).

Configuration of Relay Node

Figure 4:
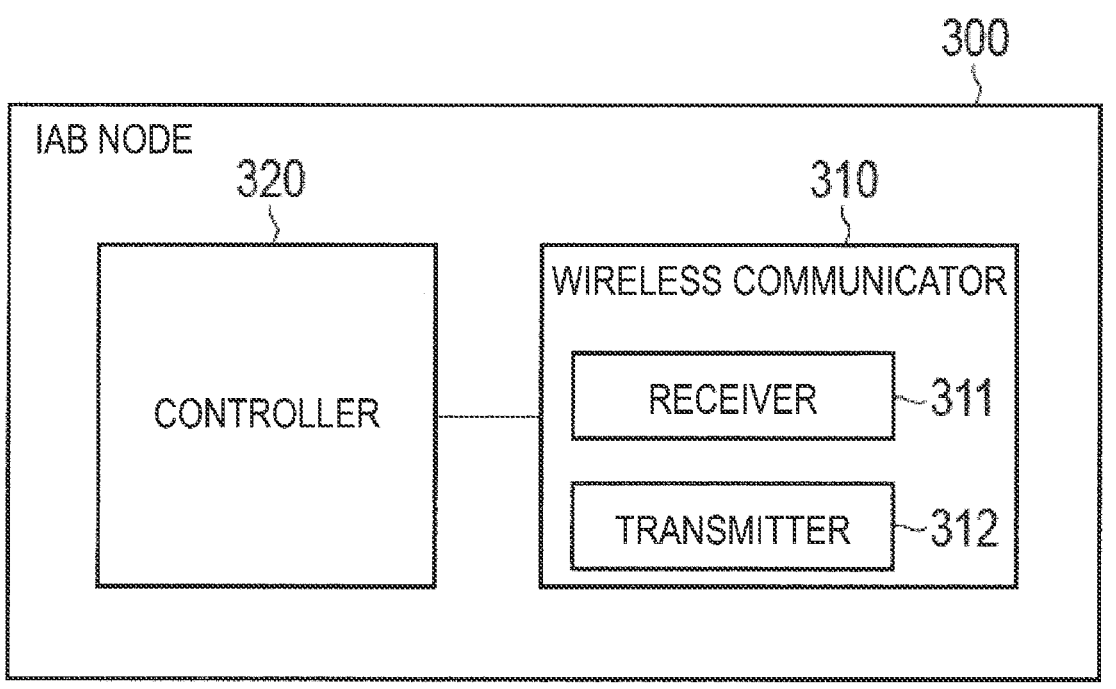
FIG. 4 is a diagram illustrating a configuration example of an IAB node (relay node) according to an embodiment.

A configuration of the IAB node 300 that is a relay node (or a relay node apparatus, which is also referred to as a relay node below in some cases) according to the embodiment is described. FIG. 4 is a diagram illustrating a configuration example of the IAB node 300. As illustrated in FIG. 4, the IAB node 300 includes a wireless communicator 310 and a controller 320. The IAB node 300 may include a plurality of wireless communicators 310.

The wireless communicator 310 performs wireless communication with the gNB 200 (BH link) and wireless communication with the UE 100 (access link). The wireless communicator 310 for the BH link communication and the wireless communicator 310 for the access link communication may be provided separately.

The wireless communicator 310 includes a receiver 311 and a transmitter 312. The receiver 311 performs various types of reception under control of the controller 320. The receiver 311 includes an antenna and converts (down-converts) a radio signal received by the antenna into a baseband signal (reception signal), and outputs the baseband signal to the controller 320. The transmitter 312 performs various types of transmission under control of the controller 320. The transmitter 312 includes an antenna and converts (up-converts) the baseband signal (transmission signal) output by the controller 320 into a radio signal, and transmits the radio signal from the antenna.

The controller 320 performs various types of controls in the IAB node 300. The controller 320 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. In each example described below, the controller 320 may perform each processing operation in the IAB node 300.

Configuration of User Equipment

Figure 5:
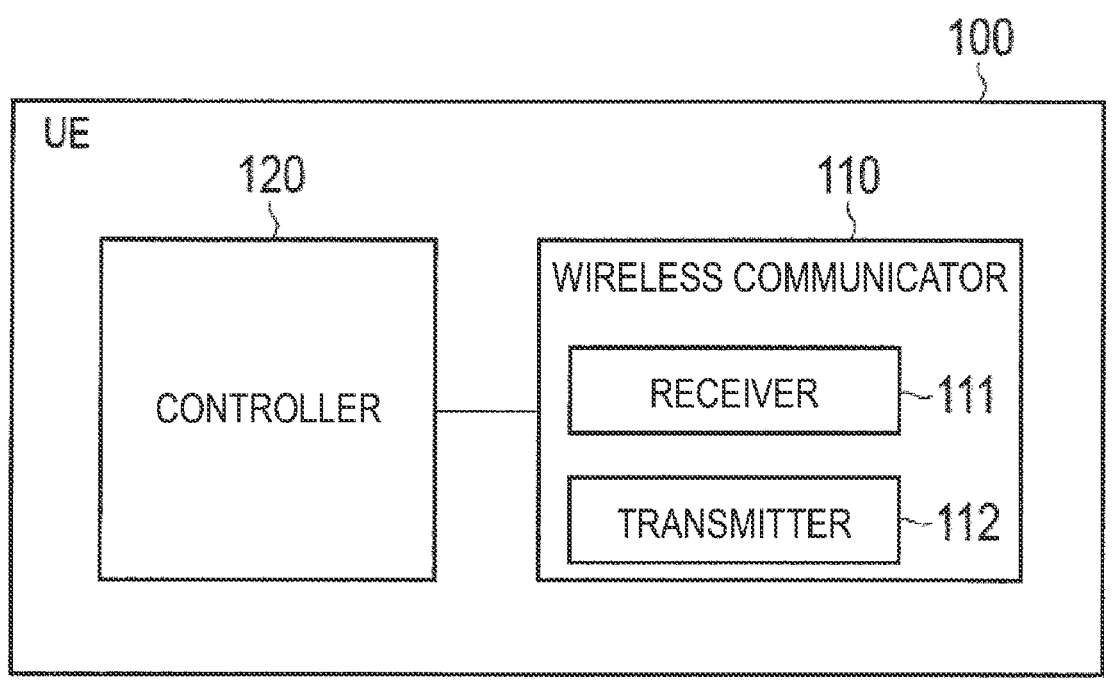
FIG. 5 is a diagram illustrating a configuration example of a UE (user equipment) according to an embodiment.

A configuration of the UE 100 that is a user equipment according to the embodiment is described next. FIG. 5 is a diagram illustrating a configuration example of the UE 100. As illustrated in FIG. 5, the UE 100 includes a wireless communicator 110 and a controller 120.

The wireless communicator 110 performs wireless communication in the access link, i.e., wireless communication with the gNB 200 and wireless communication with the IAB node 300. The wireless communicator 110 may also perform wireless communication in a sidelink, i.e., wireless communication with another UE 100. The wireless communicator 110 includes a receiver 111 and a transmitter 112. The receiver 111 performs various types of reception under control of the controller 120. The receiver 111 includes an antenna and converts (down-converts) a radio signal received by the antenna into a baseband signal (reception signal) which is then transmitted to the controller 120. The transmitter 112 performs various types of transmission under control of the controller 120. The transmitter 112 includes an antenna and converts (up-converts) the baseband signal (transmission signal) output by the controller 120 into a radio signal which is then transmitted from the antenna.

The controller 120 performs various types of control in the UE 100. The controller 120 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. In each example described below, the controller 130 may perform each processing operation in the UE 100.

Configuration of Protocol Stack

Figure 6:
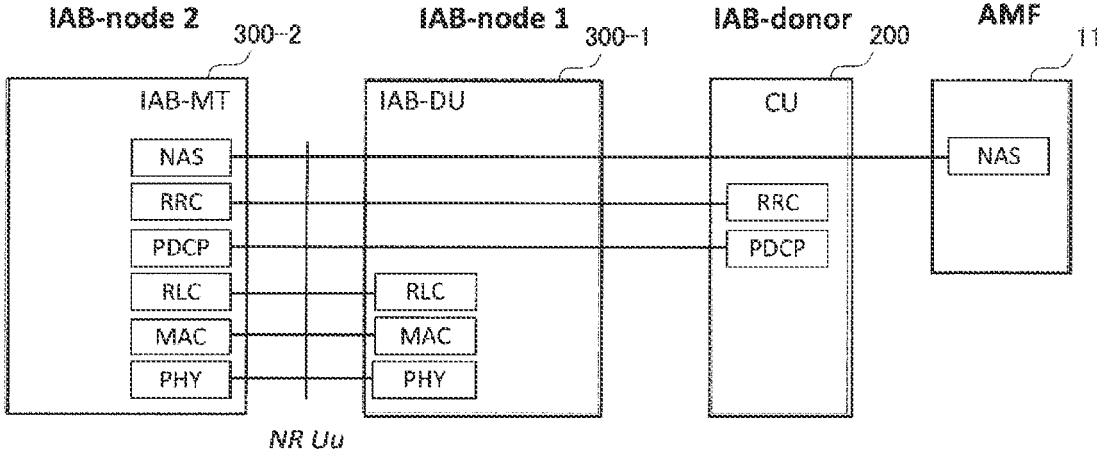
FIG. 6 is a diagram illustrating an example of a protocol stack related to an RRC connection and a NAS connection of an IAB-MT.

A configuration of a protocol stack according to the embodiment is described next. FIG. 6 is a diagram illustrating an example of a protocol stack related to an RRC connection and a NAS connection of the IAB-MT.

As illustrated in FIG. 6, the IAB-MT of the IAB node 300-2 includes a physical (PHY) layer, a Medium Access Control (MAC) layer, a Radio Link Control (RLC) layer, a Packet Data Convergence Protocol (PDCP) layer, a Radio Resource Control (RRC) layer, and a Non-Access Stratum (NAS) layer.

The PHY layer performs coding and decoding, modulation and demodulation, antenna mapping and demapping, and resource mapping and demapping. Data and control information are transmitted between the PHY layer of the IAB-MT of the IAB node 300-2 and the PHY layer of the IAB-DU of the IAB node 300-1 via a physical channel.

The MAC layer performs preferential control of data, retransmission processing using a hybrid ARQ (HARQ), a random access procedure, and the like. Data and control information are transmitted between the MAC layer of the IAB-MT of the IAB node 300-2 and the MAC layer of the IAB-DU of the IAB node 300-1 via a transport channel. The MAC layer of the IAB-DU includes a scheduler. The scheduler determines the transport format (transport block size, modulation and coding scheme (MCS)) and the assignment of resource blocks in the uplink and the downlink.

The RLC layer transmits data to the RLC layer on the reception side by using functions of the MAC layer and the PHY layer. Data and control information are transmitted between the RLC layer of the IAB-MT of the IAB node 300-2 and the RLC layer of the IAB-DU of the IAB node 300-1 via a logical channel.

The PDCP layer performs header compression and decompression, and encryption and decryption. Data and control information are transmitted between the PDCP layer of the IAB-MT of the IAB node 300-2 and the PDCP layer of the donor node 200 via a radio bearer.

The RRC layer controls a logical channel, a transport channel, and a physical channel according to establishment, reestablishment, and release of a radio bearer. RRC signaling for various configurations is transmitted between the RRC layer of the IAB-MT of the IAB node 300-2 and the RRC layer of the donor node 200. When an RRC connection to the donor node 200 is present, the IAB-MT is in an RRC connected state. When no RRC connection to the donor node 200 is present, the IAB-MT is in an RRC idle state.

The NAS layer which is positioned higher than the RRC layer performs session management, mobility management, and the like. NAS signaling is transmitted between the NAS layer of the IAB-MT of the IAB node 300-2 and the AMF 11.

Figure 7:
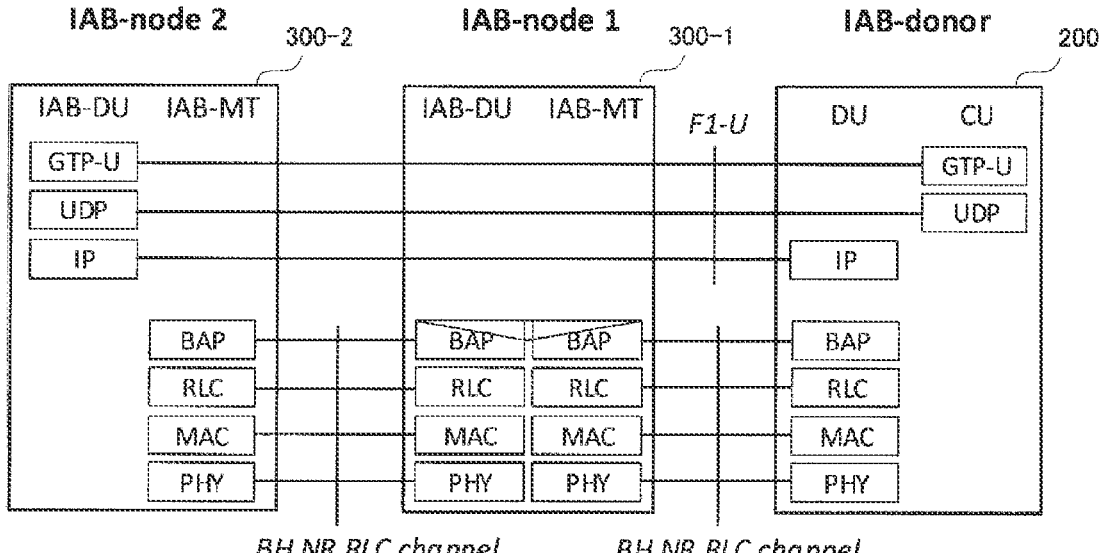
FIG. 7 is a diagram illustrating an example of a protocol stack related to an F1-U protocol.
Figure 8:
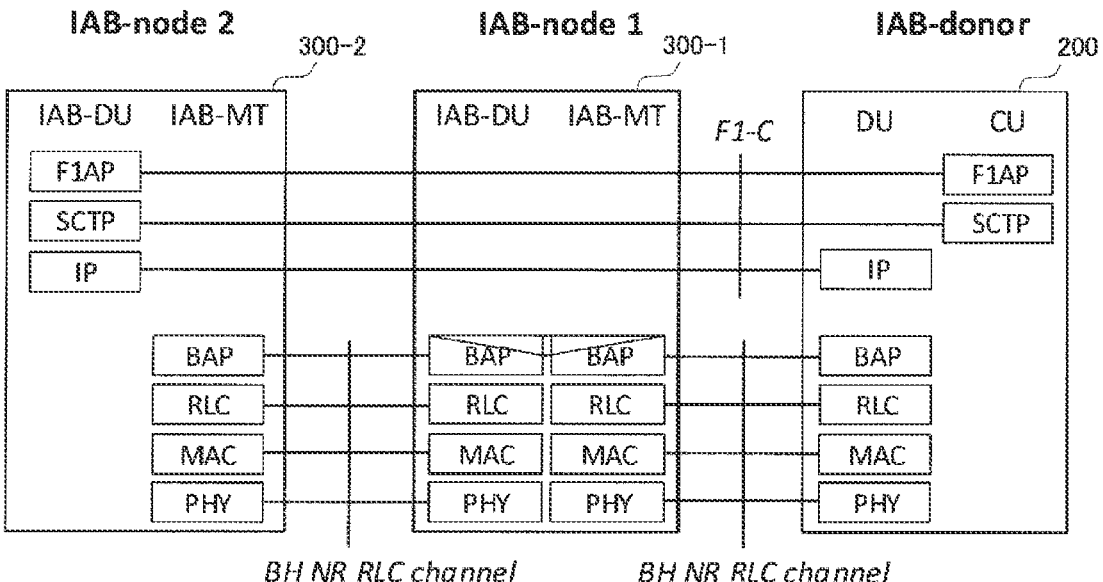
FIG. 8 is a diagram illustrating an example of a protocol stack related to an F1-C protocol.

FIG. 7 is a diagram illustrating a protocol stack related to an F1-U protocol. FIG. 8 is a diagram illustrating a protocol stack related to an F1-C protocol. Here, an example in which the donor node 200 is divided into a CU and a DU is illustrated.

Each of the IAB-MT of the IAB node 300-2, the IAB-DU of the IAB node 300-1, the IAB-MT of the IAB node 300-1, and the DU of the donor node 200 includes a Backhaul Adaptation Protocol (BAP) layer as an upper layer of the RLC layer as illustrated in FIG. 7. The BAP layer performs routing processing, and bearer mapping and demapping processing. In the backhaul, the IP layer is transmitted via the BAP layer to allow routing through a plurality of hops.

In each backhaul link, a Protocol Data Unit (PDU) of the BAP layer is transmitted by the backhaul RLC channel (BH NR RLC channel). Configuring each BH link to include multiple backhaul RLC channels enables the prioritization and QoS control of traffic. The association between the BAP PDU and the backhaul RLC channel is executed by the BAP layer of each IAB node 300 and the BAP layer of the donor node 200.

Note that the CU of the donor node 200 is a gNB-CU function of the donor node 200 that terminates the F1 interface to the IAB node 300 and the DU of the donor node 200. The DU of the donor node 200 is a gNB-DU function of the donor node 200 that hosts an IAB BAP sublayer and provides a wireless backhaul to the IAB node 300.

As illustrated in FIG. 8, the protocol stack of the F1-C protocol includes an F1AP layer and an SCTP layer instead of a GTP-U layer and a UDP layer illustrated in FIG. 7.

Note that in the description below, processing or operation performed by the IAB-DU and the IAB-MT of the IAB may be simply described as processing or operation of the "IAB". For example, in the description, transmitting, by the IAB-DU of the IAB node 300-1, a message of the BAP layer to the IAB-MT of the IAB node 300-2 is assumed to correspond to transmitting, by the IAB node 300-1, the message to the IAB node 300-2. Processing or operation of the DU or CU of the donor node 200 may be described simply as processing or operation of the "donor node".

An upstream direction and an uplink (UL) direction may be used without distinction. A downstream direction and a downlink (DL) direction may be used without distinction.

First Embodiment

Pre-Emptive Buffer Status Report (BSR)

Generally, a BSR transmitted by the UE 100 (hereinafter referred to as the "regular BSR" as appropriate) indicates, for each logical channel group (LCG), the amount of uplink data untransmitted by each of the MAC, RLC, and PDCP layers (in other words, an uplink buffer amount). Each LCG is a group including at least one logical channel and configured by priority. Based on the regular BSR received from the UE 100, the gNB 200 determines, for each LCG, the amount of uplink data untransmitted by the UE 100 and performs scheduling such that the UE 100 is allocated uplink radio resources commensurate with the amount of uplink data untransmitted.

Figure 9:
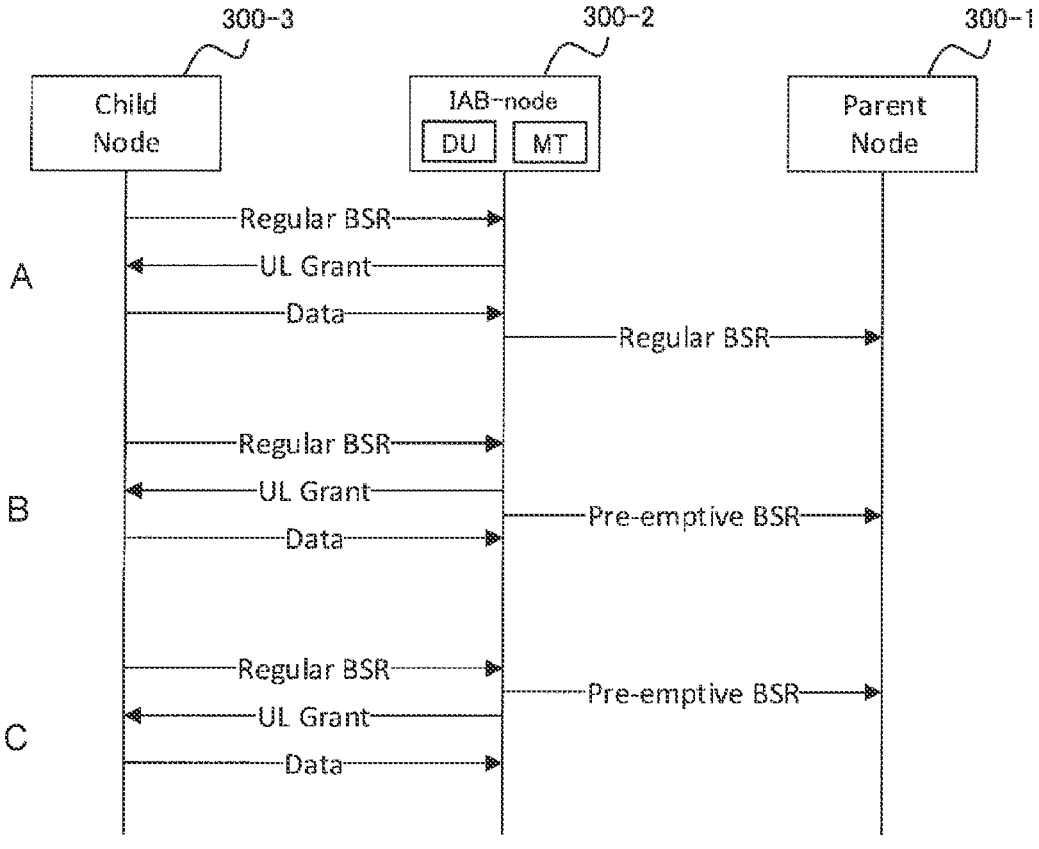
FIG. 9 is a diagram illustrating a transmission example of a pre-emptive BSR according to a first embodiment.

A portion A of FIG. 9 is a diagram illustrating a transmission example of a regular BSR between IAB nodes. The portion A of FIG. 9 illustrates an example in which an IAB node 300-2 transmits a regular BSR to a parent node 300-1 after receiving data from a child node 300-3. The IAB node 300-2 reports the amount of data waiting to be transmitted (or the amount of buffered data), which exists in (the MAC and the RLC of the IAB-MT of) the IAB node 300-2, to the parent node 300-1 by using the regular BSR as a buffer size. Then, an uplink radio resource commensurate with this data amount is allocated from the parent node 300-1. Then, the IAB node 300-2 transmits the data to the parent node 300-1 by using the radio resource.

On the other hand, portions B and C of FIG. 9 are diagrams illustrating transmission examples of a pre-emptive BSR. As illustrated in the portion B of FIG. 9, after transmitting a UL grant to the child node 300-3, the IAB node 300-2 transmits the pre-emptive BSR before receiving UL data from the child node 300-3. As illustrated in the portion C of FIG. 9, after receiving the regular BSR from the child node 300-3, the IAB node 300-2 transmits the pre-emptive BSR before transmitting the UL grant to the child node 300-3.

In this way, the pre-emptive BSR is transmitted to the parent node 300-1 at an earlier timing than the regular BSR. Accordingly, compared with the regular BSR, such pre-emptive BSR transmission enables a reduction in the delay of the UL scheduling of the parent node 300-1 for the IAB node 300-2.

Figure 10:
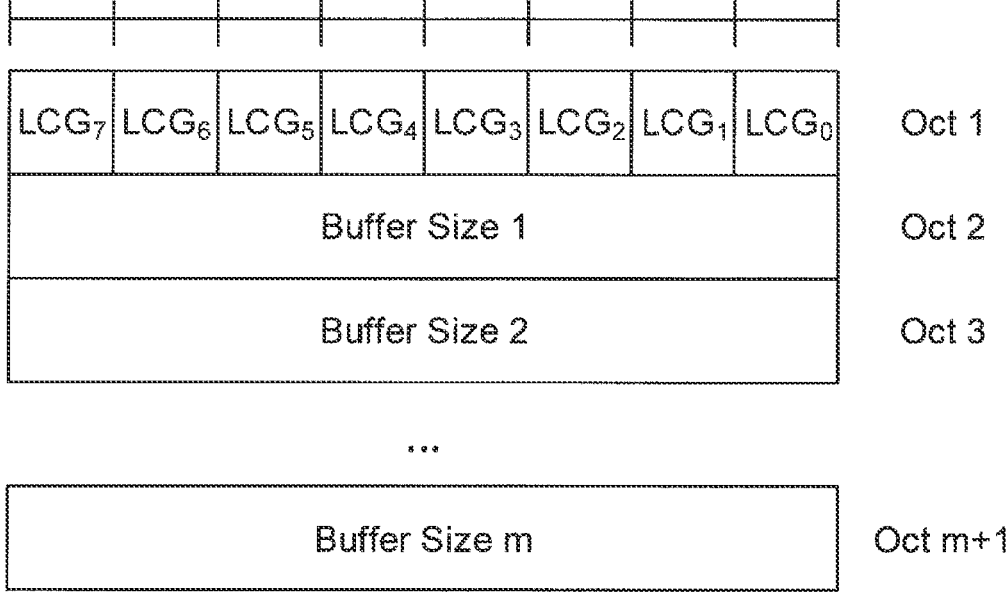
FIG. 10 is a diagram illustrating a configuration example of a Pre-emptive BSR MAC CE according to the first embodiment.

FIG. 10 is a diagram illustrating a configuration example of a Pre-emptive BSR MAC CE. The pre-emptive BSR is transmitted using the MAC CE same as and/or similar to the regular BSR. The Pre-emptive BSR MAC CE includes an $LCG_i$ field and a buffer size field as illustrated in FIG. 10.

$LCG_i$ is a field indicating that a buffer size of a logical channel group i exists. In other words, $LCG_i$ configured with "1" indicates that the buffer size of the logical channel group i will be reported. On the other hand, $LCG_i$ configured with "0" indicates that the buffer size of the logical channel group i will not be reported.

The buffer size identifies the total amount of data expected to reach the IAB-MT of the IAB node 300 for which the pre-emptive BSR has been triggered, and does not include the total amount of data currently available at the IAB-MT.

The pre-emptive BSR has been described above and can be summarized as follows.

In other words, when the configuration has been performed, and one of the following events (A1) and (A2) occurs, the pre-emptive BSR is triggered in a particular case for the IAB-MT.

(A1) The UL grant is provided to the child node or UE.

(A2) The BSR is received from the child node or the UE.

Note that (A1) corresponds to the portion B of FIG. 9, and (A2) corresponds to the portion C of FIG. 9.

Although two types of triggers of the pre-emptive BSR are defined as described above, reported $LCG_i$, calculation of an expected data amount, related Logical Channel (LCH), and the like are implementation dependent.

However, for example, in the portions B or C of FIG. 9, from the viewpoint of the parent node 300-1, even when the pre-emptive BSR is received, the timing for transmitting the UL data transmitted from the IAB node 300-2 (which may hereinafter be referred to as "child node 300-2") is not known. Immediately before the child node 300-2 transmits the UL data, the parent node 300-1 allocates a radio resource for the UL data of the child node 300-2, and when the UL grant can be transmitted to the child node 300-2, the UL grant can be transmitted at an appropriate timing. However, since the timing for transmitting the UL data is not known as described above, the parent node 300-1 may not be able to transmit the UL grant at the appropriate timing.

As described above, the buffer size included in the preemptive BSR "identifies the total amount of data expected to arrive at the IAB-MT of the IAB node 300 for which the preemptive BSR has been triggered, and does not include the total amount of data currently available at the IAB-MT. Although the buffer size is implementation dependent, it is unknown whether "data expected to arrive at the IAB-MT of the IAB node 300" is data buffered in the IAB-DU of the child node 300-2 or data buffered in the IAB-MT of the IAB node 300-3 that is a child node of the child node 300-2, or includes both data. Furthermore, the timing when the preemptive BSR is triggered differs between (A1) and (A2). Data changes from moment to moment, and thus, different timings may correspond to different data amounts. Accordingly, the buffer size may also differ between (A1) and (A2). The parent node 300-1, having received the report of the buffer size, cannot accurately predict the buffer size. Accordingly, the parent node 300-1, having received the report, cannot generate an appropriate UL grant and transmit the appropriate UL grant to the child node 300-2.

As described above, a problem with the pre-emptive BSR is that, for the parent node 300-1, the timing for receiving the UL data is unknown, and thus, the parent node 300-1 cannot transmit the appropriate UL grant to the child node 300-2 at the appropriate timing.

In order to solve this problem, it is conceivable that the donor node configures, for the IAB node transmitting the pre-emptive BSR, which event of (A1) and (A2) is used to trigger the pre-emptive BSR.

However, even though which of the events is used for the IAB node to transmit the pre-emptive BSR can be configured, the parent node receiving the pre-emptive BSR does not know which of the events is used to trigger the preemptive BSR (or to transmit the pre-emptive BSR). Accordingly, the parent node may not know the timing of receiving the UL data, and may fail to transmit the appropriate UL grant at the appropriate timing.

Thus, in the first embodiment, the donor node 200 transmits, to the parent node 300-1, the trigger type for the pre-emptive BSR configured for the child node 300-2. Specifically, the donor base station (for example, the donor node 200) with the first and second relay nodes as lower nodes of the donor base station transmits the trigger type for the pre-emptive BSR to the second relay node (for example, the parent node 300-1) that is the parent node of the first relay node (for example, the child node 300-2). At this time, the donor base station transmits, to the second relay node, the trigger type configured for the first relay node. Second, the first relay node triggers the pre-emptive BSR to the second relay node in accordance with the trigger type.

Figure 11:
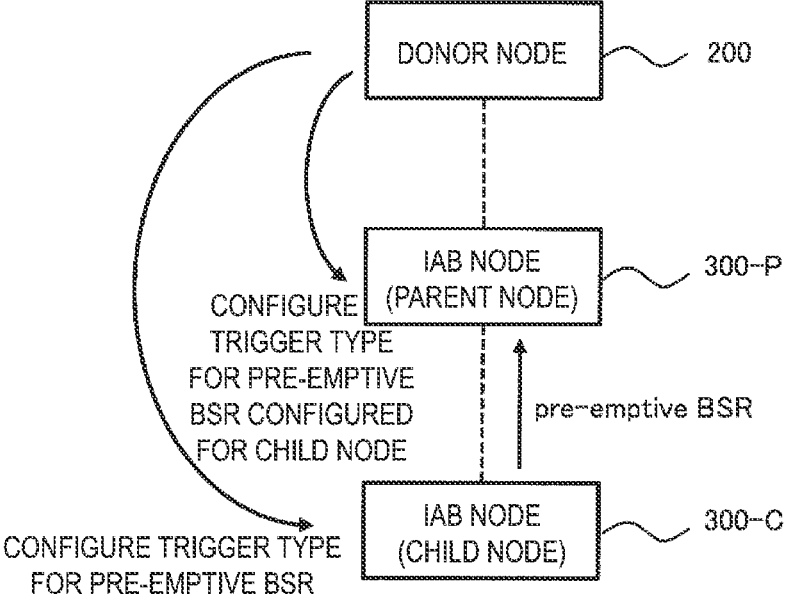
FIG. 11 is a diagram illustrating a configuration example according to the first embodiment.

FIG. 11 is a diagram illustrating a configuration example according to the first embodiment. Note that in the following description, the "trigger type" is information indicating one of the events (or timings) (A1) and (A2). In the following description, "trigger" and "transmission" may be used with the same meaning.

Note that FIG. 11 illustrates an example in which at least one IAB node exists between the donor node 200 and the IAB node 300-P but that such an IAB node may not exist, and the IAB node 300-P may exist immediately lower than the donor node 200.

In FIG. 11, the IAB node 300-P is the parent node of the IAB node 300-C. The IAB node 300-C is a child node of the IAB node 300-P. Hereinafter, the IAB nodes may be referred to as the parent node 300-P and the child node 300-C. The child node 300-C may be the UE 100. In this case, when the donor node 200 and the UE 100 are RRC connected, the donor node 200 can be directly configured for the UE 100 by using an RRC message.

As illustrated in FIG. 11, the donor node 200 first configures the trigger type for the pre-emptive BSR for the child node 300-C. After that, the donor node 200 transmits, to the parent node 300-P, the trigger type for the pre-emptive BSR configured for the child node 300-C. In other words, the parent node 300-P acquires information of the trigger type for the received pre-emptive BSR. Then, the child node 300-C transmits the pre-emptive BSR to the parent node 300-P in accordance with the configured trigger type.

Figure 12:
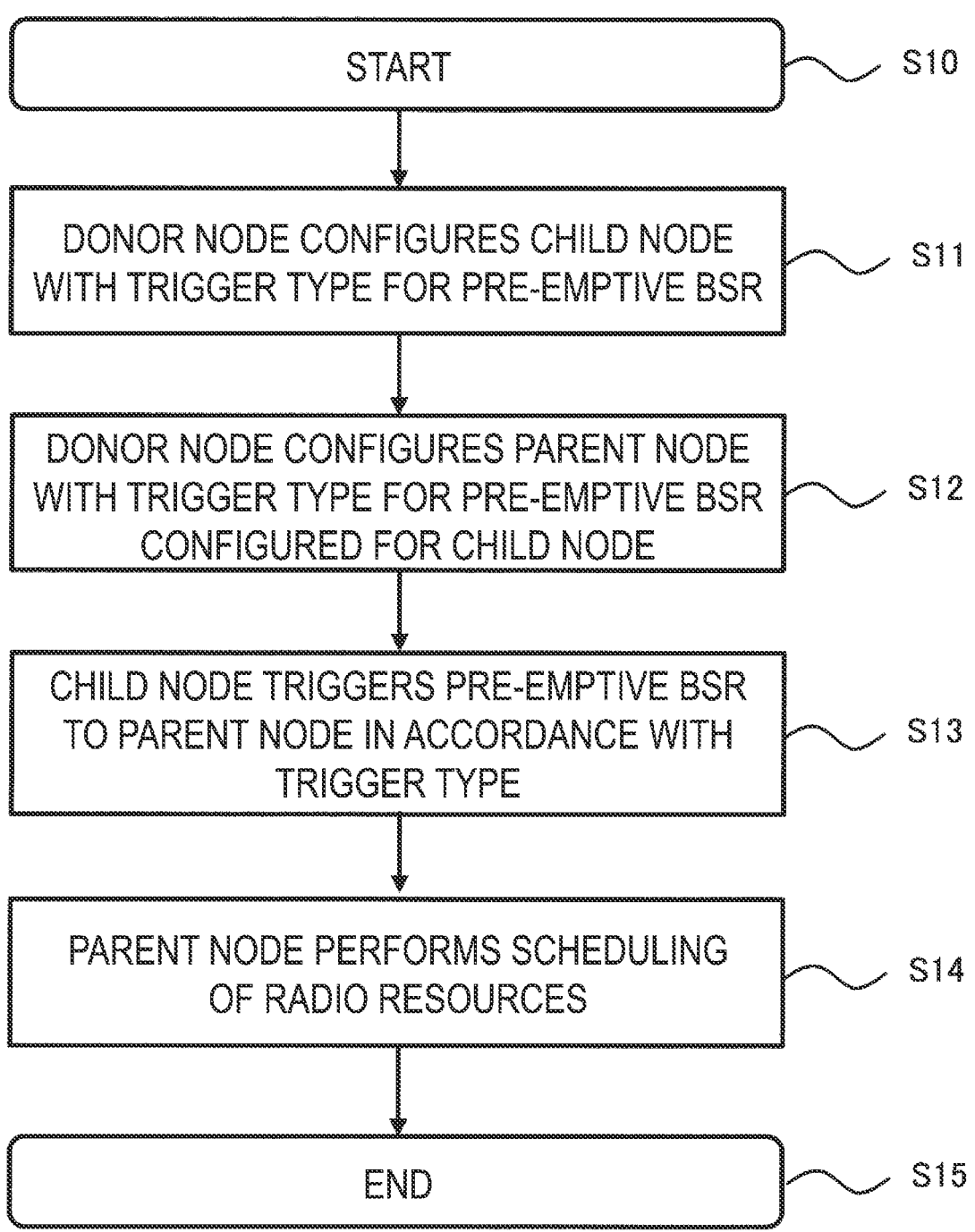
FIG. 12 is a flowchart illustrating an operation example according to the first embodiment.

FIG. 12 is a flowchart illustrating an operation example according to the first embodiment. The operation example illustrated in FIG. 12 will be described with reference to the relationship in FIG. 11 as appropriate.

In step S10, the donor node 200 starts processing.

In step S11, the donor node 200 configures the trigger type for the pre-emptive BSR to the child node 300-C. The CU of the donor node 200 may be configured by transmitting the RRC message to the IAB-MT of the child node 300-C. Alternatively, the CU of the donor node 200 may be configured by transmitting an F1AP message to the IAB-DU of the child node 300-C. Note that the parent node 300-P may transmit, to the donor node 200, the trigger type (or preference information) to be used by the child node 300-C. In this case, in response to this notification, the donor node 200 configures the trigger type for the child node 300-C.

In step S12, the donor node 200 transmits, to the parent node 300-P, the trigger type configured for the child node 300-C. The trigger type may be transmitted by using the RRC message or the F1AP message as in step S11. Note that the parent node 300-P may inquire of the donor node 200 about the current configured value of the trigger type. In other words, the parent node 300-P may inquire about the trigger type configured for the child node 300-C. In this case, in response to the inquiry, the donor node 200 transmits the trigger type to the parent node 300-P.

Note that the donor node 200 may transmit mapping information between the logical channel group (LCG) and the logical channel (LCH) to the parent node 300-P together with the trigger type. For example, the mapping information is $LCG_1$=$LCH_1$ to $LCH_3$, $LCG_2$=$LCH_4$ to $LCH_6$, or the like. Note that the logical channel group includes at least one or more logical channels. The buffer size reported as a pre-emptive BSR is calculated for each logical channel group in which data is present. By the parent node 300-P recognizing the buffer size for each logical channel group and the logical channels included in the logical channel group, which are included in the pre-emptive BSR, when Quality of Service (QoS) information is provided for each logical channel, the information can be utilized for scheduling. Note that the trigger type and/or the mapping information between the logical channel group and the logical channel may be associated with the identifier of the child node 300-C. Examples of the identifier include a UE ID, a C-RNTI, and a F1AP UE ID.

In step S13, the IAB-MT of the child node 300-C triggers the pre-emptive BSR to the IAB-DU of the parent node 300-P in accordance with the configured trigger type.

In step S14, the IAB-DU of the parent node 300-P schedules radio resources, based on the trigger type received from the donor node 200 and the pre-emptive BSR received from the child node 300-C. The IAB-DU of the parent node 300-P transmits, to the IAB-MT of the child node 300-C, the UL grant including scheduling results.

In step S15, the parent node 300-P terminates a series of processing operations.

As described above, in the first embodiment, the donor node 200 configures, for the parent node 300-P, the trigger type for the pre-emptive BSR configured for the child node 300-C (step S12). Therefore, the parent node 300-P can recognize the trigger type configured for the child node 300-C, and can recognize whether the pre-emptive BSR is triggered by the event (A1) or (A2). Thus, in anticipation of the timing of the trigger, the parent node 300-P can transmit the UL grant at the appropriate timing. By recognizing at least whether the pre-emptive BSR has been triggered by the event (A1) or (A2), the parent node 300-P can predict the appropriate buffer size, allocate radio resources, and transmit the appropriate UL grant to the child node 300-C.

Second Embodiment

A second embodiment is an example in which the parent node 300-P transmits, to the child node 300-C, the trigger type for the pre-emptive BSR to be used by the child node 300-C.

Specifically, first, the second relay node (for example, the parent node 300-P) that is the parent node of the first relay node (for example, the child node 300-C) transmits the trigger type for the pre-emptive BSR to the first relay node. Second, the first relay node triggers the pre-emptive BSR to the second relay node in accordance with the trigger type.

As described above, also in the second embodiment, since the parent node 300-P can recognize the trigger type triggered by the child node 300-C, the parent node 300-P can transmit the appropriate UL grant to the child node 300-C at the appropriate timing as in the first embodiment.

Figures 13A, 13B:
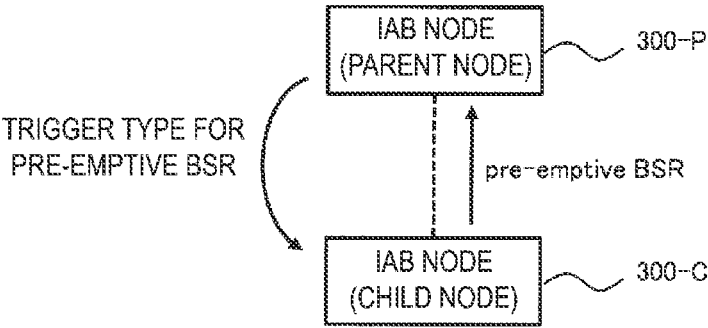
FIG. 13A is a diagram illustrating a transmission example according to a second embodiment.
FIG. 13B is a diagram illustrating a configuration example of "usePre-BSR" according to the second embodiment.

FIG. 13A is a diagram illustrating a transmission example according to the second embodiment. The parent node 300-P transmits the trigger type to the child node 300-C. The child node 300-C triggers the pre-emptive BSR to the parent node 300-P in accordance with the trigger type.

Figure 14:
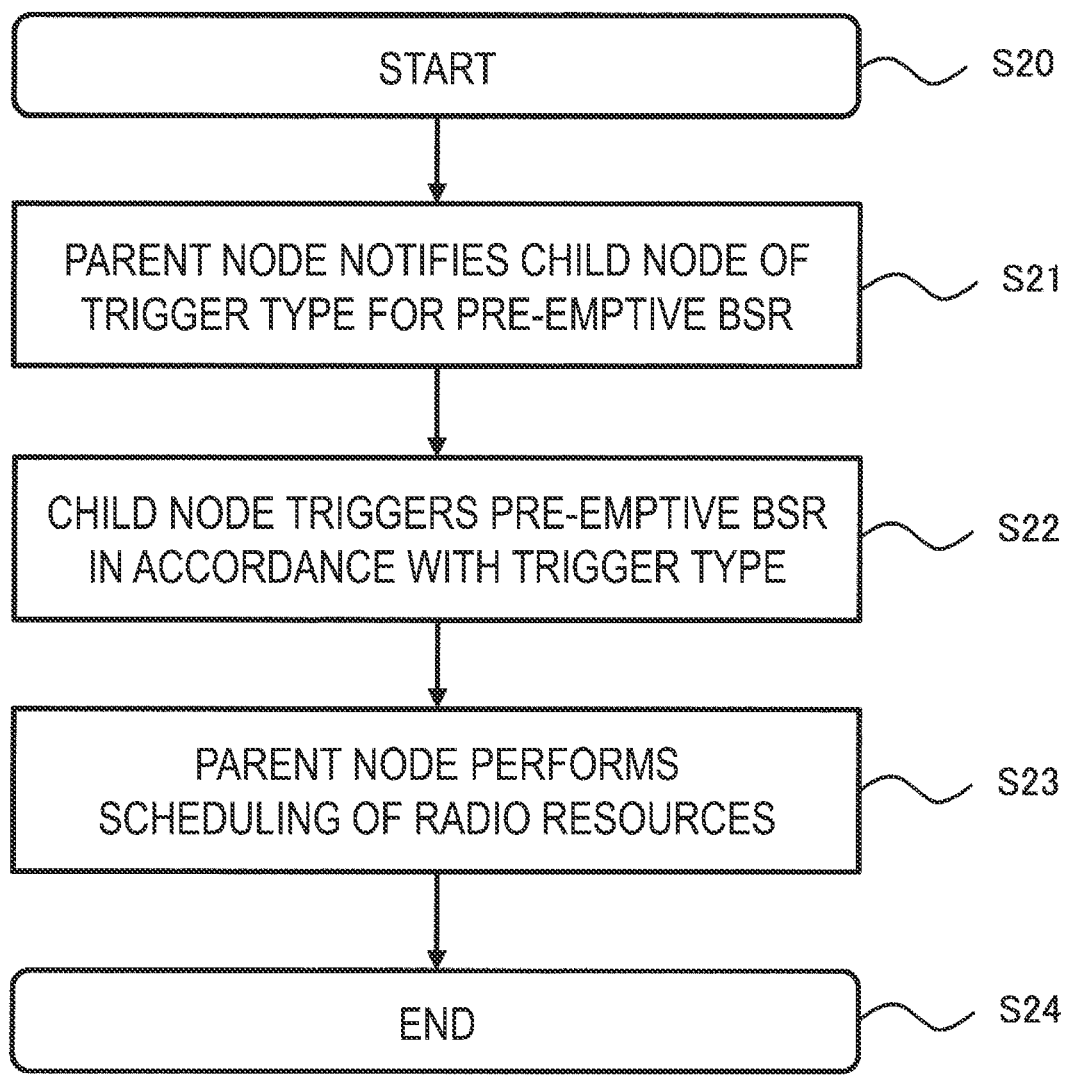
FIG. 14 is a flowchart illustrating an operation example according to the second embodiment.

FIG. 14 is a flowchart illustrating an operation example in the second embodiment.

In step S20, the parent node 300-P starts processing.

In step S21, the parent node 300-P transmits the trigger type for the pre-emptive BSR to the child node 300-C. This transmission may be an indication, by the parent node 300-P, of the trigger type to the child node 300-C. For example, the IAB-DU of the parent node 300-P transmits the trigger type by transmitting, to the IAB-MT of the child node 300-C, a MAC Control Element (CE) or a BAP Control PDU including the trigger type. A System Information Block 1 (SIB1) may be used to transmit the trigger type.

Note that before step S21, the donor node 200 may provide the parent node 300-P with a configuration indicating that the child node 300-C is permitted to use the pre-emptive BSR. In 3GPP, information elements included in the RRC message (RRC setup message) include "usePre-BSR", which allows the permission to use the pre-emptive BSR to be configured. FIG. 13B is a diagram illustrating a configuration example of "usePreBSR" according to the second embodiment. For example, the donor node 200 configures the permission to use the pre-emptive BSR by transmitting, to the child node 300-C, the RRC message including "usePreBSR". Then, in step S21, the donor node 200 notifies the parent node 300-P that the use permission is configured for the child node 300-C. In other words, the parent node 300-P may perform the processing of step S21 by being notified by the donor node 200 that the use permission of the pre-emptive BSR is configured for the child node 300-C.

Note that when the donor node 200 configures the use permission for the child node 300-C, upon receiving the trigger type from the parent node 300-P, the child node 300-C may apply the received trigger type. On the other hand, when the use permission is not configured by the donor node 200, upon receiving the trigger type from the parent node 300-P, the child node 300-C may ignore the received trigger type.

In step S21, the child node 300-C, having received the trigger type, may transmit, to the parent node 300-P, a response indicating whether to accept the received trigger type. For example, upon receiving a trigger type that is not supported, the child node 300-C transmits a response indicating that the trigger type is rejected to accept (or the trigger type is not accepted) to the parent node 300-P. The response may be performed by inserting 1-bit information (whether to accept the trigger type) into the header portion of the (Pre-emptive) BSR MAC CE, or by using a separate, dedicated MAC CE.

In step S22, the child node 300-C triggers a pre-emptive BSR to the parent node 300-P according to the trigger type received from the parent node 300-P.

In step S23, the parent node 300-P performs scheduling, based on the trigger type transmitted to the child node 300-C and the pre-emptive BSR received from the child node 300-C. Then, the parent node 300-P transmits the UL grant to the child node 300-C.

In step S24, the parent node 300-P terminates the series of processing operations.

Variation

A variation of the second embodiment will be described. The variation is an example in which the donor node 200 provides the parent node 300-P with a configuration indicating that the trigger type for the child node 300-C may be decided. Specifically, first, the donor base station (for example, the donor node 200) with the first and second relay nodes as the lower nodes of the donor base station performs configuration of the second relay node (for example, the parent node 300-P) with permission to decide the trigger type for the first relay node (for example, the child node 300-C). Second, the second relay node for which the configuration has been performed transmits the trigger type to the first relay node.

Figure 15A:
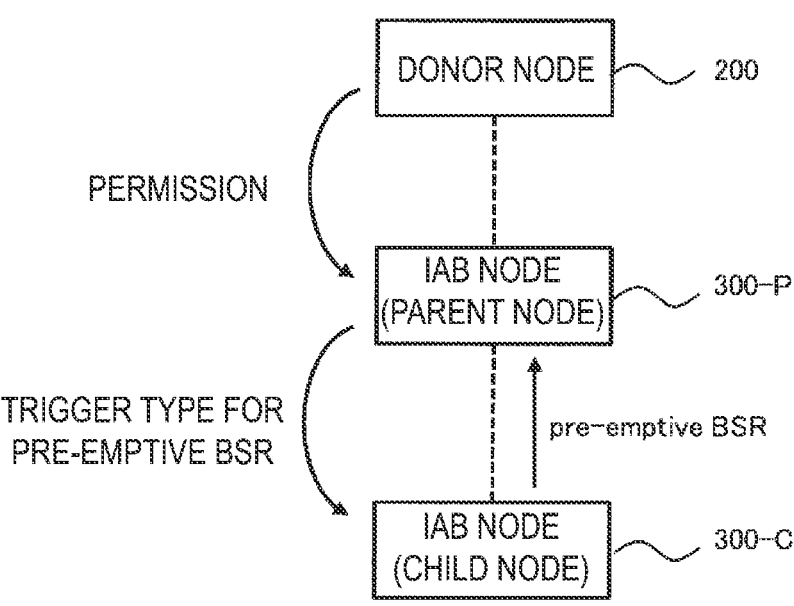
FIG. 15A is a diagram illustrating a configuration example according to a variation of the second embodiment.
Figure 15B:
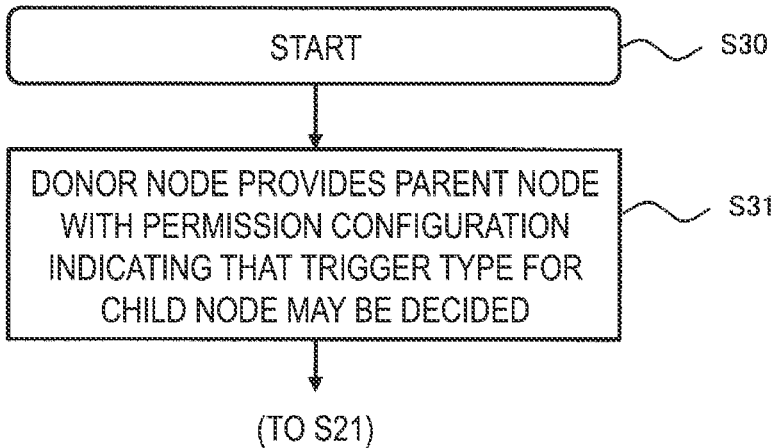
FIG. 15B is a flowchart illustrating an operation example according to the variation of the second embodiment.

FIG. 15A is a diagram illustrating a configuration example according to a variation of the second embodiment. FIG. 15B is a flowchart illustrating an operation example according to the variation of the second embodiment. The operation example according to the variation will be described with reference to FIG. 15B while appropriately referring to FIG. 15A.

The donor node 200 starts processing in step S30 as illustrated in FIG. 15B.

In step S31, the donor node 200 provides the parent node 300-P with a permission configuration indicating that the trigger type for the child node 300-C may be decided. Such configuration is performed by using, for example, the RRC message or the F1AP message. In this case, the message may contain a list of "event (A1)", "event (A2)", and "child node may decide the trigger type" in such a manner that any one of these items can be selected. To be more specific, the message may contain a list of "UL grant Transmission" (=A1), "BSR reception" (=A2), and "self-decision" (="child node may decide the trigger type"), and may indicate selected items and unselected items by using "true" or "false" (or "1" or "0").

Subsequently, as is the case with the second embodiment, the processing subsequent to step S21 (FIG. 14), in other words, the processing in which the parent node 300-P transmits the trigger type to the child node 300-C, and the like are executed. Note that the child node 300-C may determine that permission has been obtained, by receiving a notification from the parent node 300-P even when the donor node 200 has not provided the configuration indicating the permission for the pre-emptive BSR. The parent node 300-P may further notify the child node 300-C that the parent node 300-P has obtained permission from the donor node 200.

In the variation, the parent node 300-P can configure the trigger type for the child node 300-C, by receiving the permission configuration from the donor node 200.

Third Embodiment

A third embodiment is an example in which the child node 300-C transmits, to the parent node 300-P, the trigger type for the pre-emptive BSR to be used by the child node 300-C. Specifically, first, the first relay node (for example, the child node 300-C) that is a child node of the second relay node (for example, the parent node 300-P) transmits the trigger type for the pre-emptive BSR to the second relay node. Second, the first relay node triggers the pre-emptive BSR to the second relay node in accordance with the trigger type.

Also in the third embodiment, the parent node 300-P receives, from the child node 300-C, the trigger type to be used by the child node 300-C, and can thus recognize the trigger type to be used by the child node 300-C. Accordingly, as in the first embodiment, the parent node 300-P can transmit the appropriate UL grant at the appropriate timing.

Figure 16A:
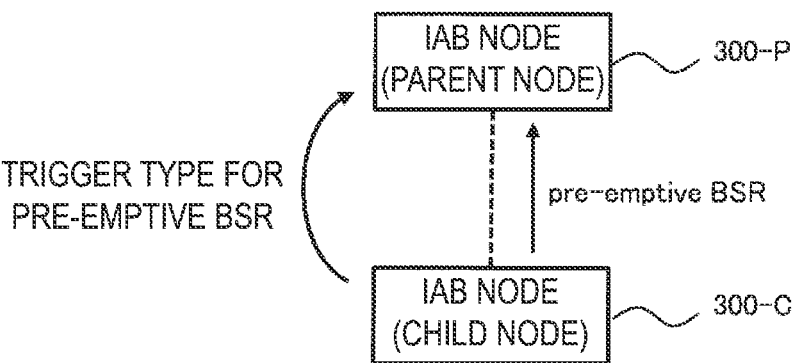
FIG. 16A is a diagram illustrating a transmission example according to a third embodiment.

FIG. 16A is a diagram illustrating a transmission example according to the third embodiment. The child node 300-C transmits the trigger type to the parent node 300-P. In this case, the trigger type for the child node 300-C may be configured by the donor node 200 or may be decided depending on the implementation of the child node 300-C. Then, the child node 300-C triggers the pre-emptive BSR to the parent node 300-P in accordance with the transmitted trigger type.

Figure 16B:
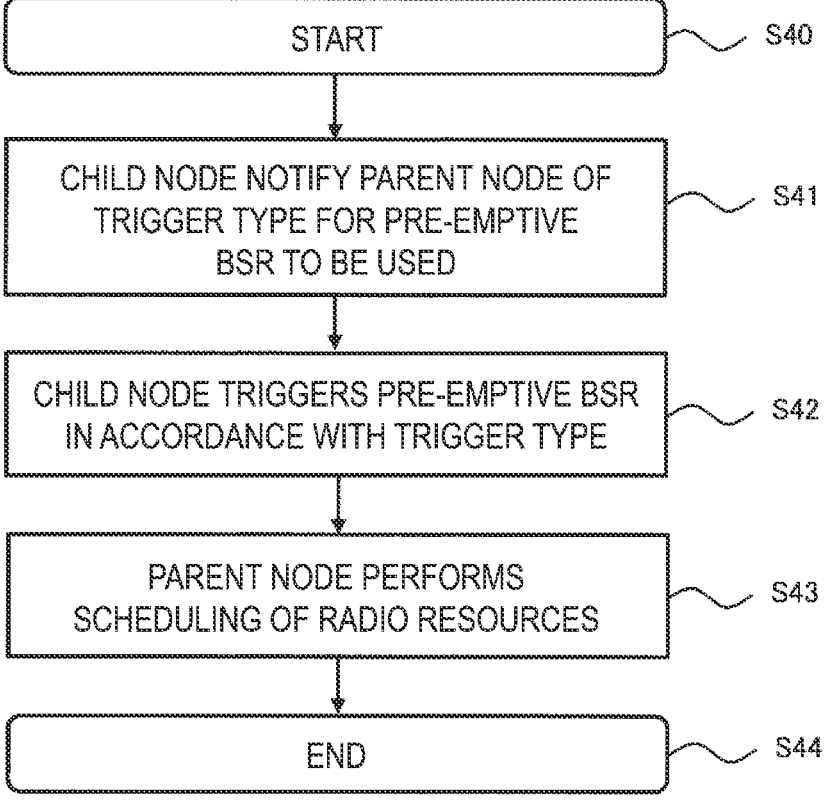
FIG. 16B is a diagram illustrating an operation example according to the third embodiment.

FIG. 16B is a flowchart illustrating an operation example according to the third embodiment.

In step S40, the child node 300-C starts processing.

In step S41, the child node 300-C transmits, to the parent node 300-P, the trigger type to be used by the child node 300-C. With respect to the transmission timing, the child node 300-C may transmit the trigger type when the donor node 200 configures the trigger type for the child node 300-C, or when the child node 300-C configures the trigger type. Alternatively, the child node 300-C may transmit the trigger type each time the pre-emptive BSR is transmitted. The trigger type may be transmitted by using the MAC CE or the BAP Control PDU. When the MAC CE is used, the trigger type may be represented by providing "UL grant (=A1) or BSR (=A2)" in the header portion of the (Pre-emptive) BSR MAC CE as 1-bit information, or may be transmitted by using a separate, dedicated MAC CE.

When the trigger type is represented in the header portion of the Pre-emptive BSR MAC CE as 1-bit information, the trigger type may be (dynamically) changed for each transmission of the pre-emptive BSR. For example, when triggering the first pre-emptive BSR, the child node 300-C inserts the indication of (A1) into the header portion of the pre-emptive BSR MAC CE as 1-bit information, and triggers the pre-emptive BSR at the timing of (A1). Then, when transmitting the next pre-emptive BSR, the child node 300-C inserts the indication of (A2) into the header portion as 1-bit information, and triggers the pre-emptive BSR at the timing of (A2).

When the trigger type is transmitted by the dedicated MAC CE, the trigger type may be fixed after this transmission until the trigger type is transmitted by the next dedicated MAC CE.

Either when the trigger type is represented in the header portion of the Pre-emptive BSR MAC CE as 1-bit information or when the trigger type is transmitted by the dedicated MAC CE, the trigger type may be transmitted by (only) the MAC header of the MAC PDU. In other words, the MAC header includes a Logical Channel ID (LCID), and the LCID allows the MAC CE to be identified as the trigger type and the Pre-emptive BSR. For example, LCID=313 indicates that the trigger type is (A), and LCID=312 indicates that the trigger type is (B). For example, LCID=311 indicates the Pre-emptive BSR MAC CE of the trigger type (A). In this case, the buffer size (BS) is also reported by using the corresponding MAC CE. Furthermore, for example, LCID=310 indicates the Pre-emptive BSR MAC CE of the trigger type (B). Also in this case, the BS is reported by using the corresponding MAC CE.

In step S42, the child node 300-C triggers the pre-emptive BSR in accordance with the trigger type transmitted to the parent node 300-P.

In step S43, the parent node 300-P performs scheduling based on the trigger type received from the child node 300-C and the pre-emptive BSR received from the child node 300-C. Then, the parent node 300-P transmits the UL grant to the child node 300-C.

In step S44, the parent node 300-P terminates the series of processing operations.

Variation of Third Embodiment

A variation of the third embodiment is an example in which the donor node 200 configures the child node 300-C with permission for dynamic trigger decision. Specifically, the donor base station (for example, the donor node 200) with the first and second relay nodes as the lower nodes of the donor base station performs configuration of the first relay node (for example, the child node 300-C) with permission to decide the trigger type. Second, the first relay node for which the configuration has been performed transmits the trigger type to the second relay node (for example, the parent node 300-P). In the variation, the child node 300-C itself is assumed to dynamically change the trigger type.

Figure 17:
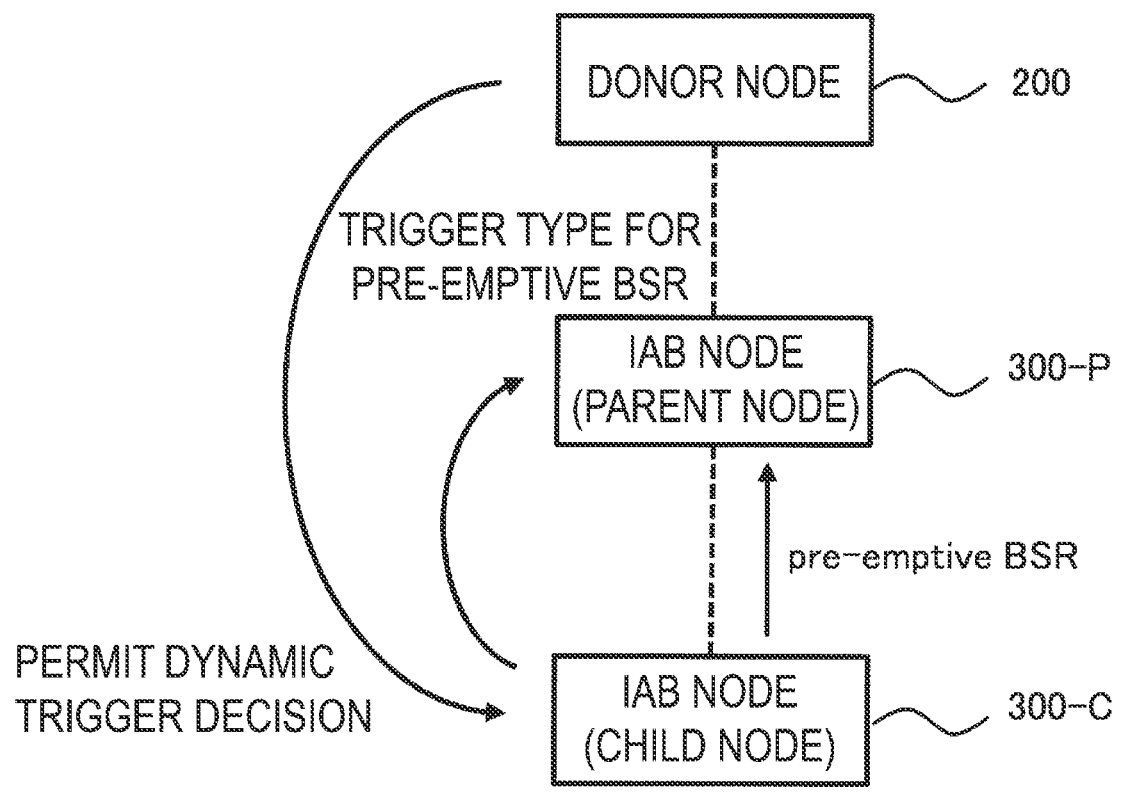
FIG. 17 is a diagram illustrating a configuration example according to a variation of the third embodiment.

FIG. 17 is a diagram illustrating a configuration example according to the variation of the third embodiment. As illustrated in FIG. 17, the donor node 200 configures the child node 300-C with permission for the dynamic trigger decision. The child node 300-C itself decides the trigger type and triggers the pre-emptive BSR.

Figure 18:
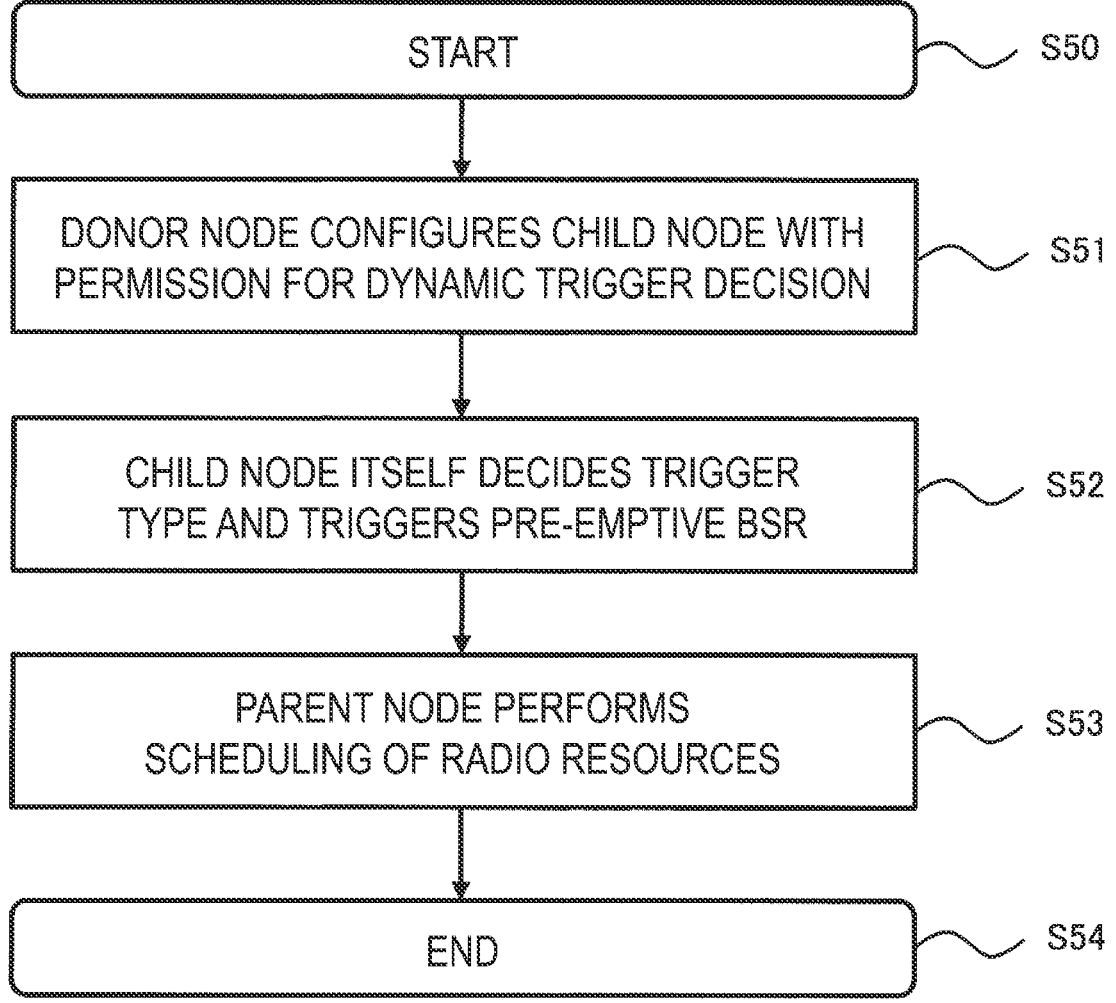
FIG. 18 is a flowchart illustrating an operation example according to the variation of the third embodiment.

FIG. 18 is a flowchart illustrating an operation example according to the variation of the third embodiment.

In step S50, the donor node 200 starts processing.

In step S51, the donor node 200 provides the child node 300-C with a configuration indicating that the dynamic trigger decision is permitted. The permission for the dynamic trigger decision may be permission for the child node 300-C itself to decide the trigger type. Such configuration is performed by using the RRC message or the F1AP message. As in the variation of the second embodiment, the message may contain a list of "event (A1)", "event (A2)", and "dynamic trigger decision" and indicate that any one of these items has been selected. Alternatively, the message may contain a list of "UL grant Transmission" (=A1), "BSR reception" (=A2), and "dynamic triggers" (="child node may dynamically decide the trigger"), and may indicate selected items and unselected items by using "true" or "false" (or "1" or "0").

In step S52, the child node 300-C itself decides the trigger type and triggers the preemptive BSR to the parent node 300-P in accordance with the decided trigger type. Before, during, or after the transmission of the pre-emptive BSR, the child node 300-C transmits the trigger type to the parent node 300-P. The transmission itself of the trigger type to the parent node 300-P is the same as that in the third embodiment.

Also in the variation, the parent node 300-P receives the trigger type from the child node 300-C, and can thus transmit the appropriate UL grant to the child node 300-C at the appropriate timing, as in the first embodiment and the like.

Note that although, in the variation, the donor node 200 provides the child node 300-C with a configuration indicating the permission for the dynamic trigger decision, the parent node 300-P may permit the child node 300-C to dynamically decide the trigger. For example, the parent node 300-P may make the permission by transmitting, to the child node 300-C, the MAC CE or a BAP Control PDU including the permission for the decision.

Fourth Embodiment

A fourth embodiment is an example in which the donor node 200 configures the trigger type for the parent node 300-P, and in which the parent node 300-P transmits the trigger type to the child node 300-C. Specifically, first, the donor base station (for example, the donor node 200) with the first and second relay nodes as the lower nodes of the donor base station transmits the trigger type for the pre-emptive BSR to the second relay node (for example, the parent node 300-P) that is the parent node of the first relay node (for example, the child node 300-C). Second, the second relay node transmits the trigger type to the first relay node. Third, the first relay node triggers the pre-emptive BSR in accordance with the trigger type received from the second relay node.

Also in the fourth embodiment, the parent node 300-P receives, from the donor node 200, the configuration of the trigger type to be used by the child node 300-C, and can thus recognize the trigger type to be used by the child node 300-C. Therefore, also in the fourth embodiment, as in the first embodiment and the like, the parent node 300-P can transmit the appropriate UL grant to the child node 300-C at the appropriate timing.

Figure 19:
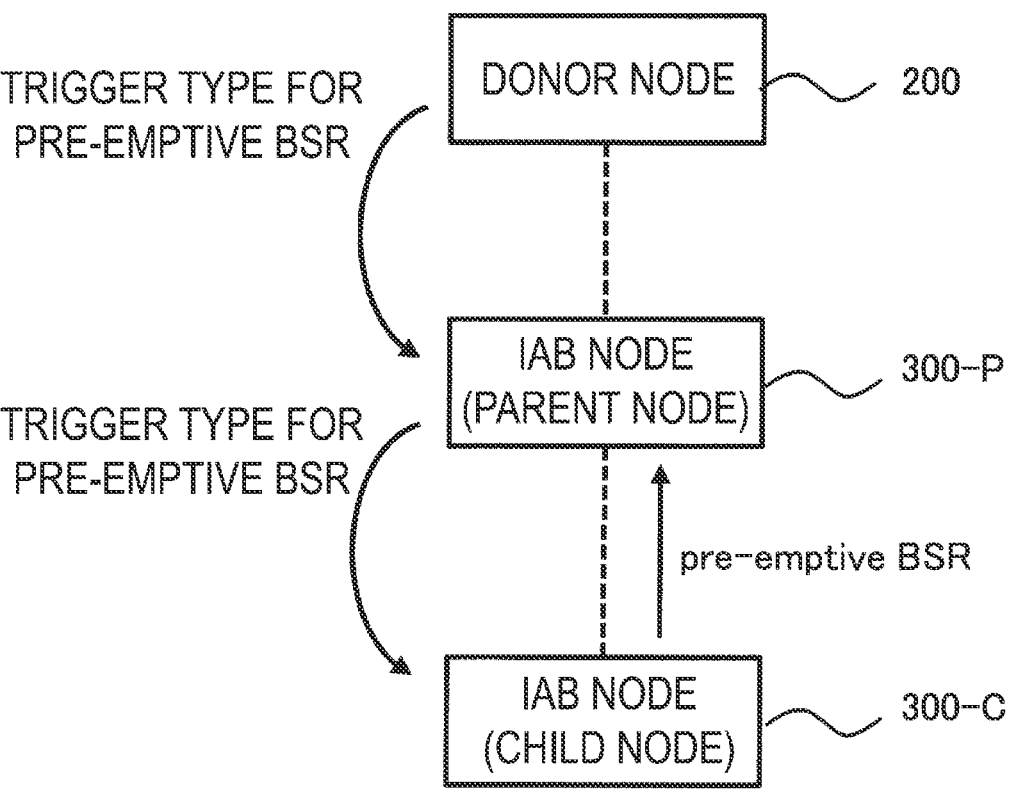
FIG. 19 is a diagram illustrating a configuration example according to a fourth embodiment.

FIG. 19 is a diagram illustrating a configuration example according to the fourth embodiment. As illustrated in FIG. 19, the donor node 200 configures, for the parent node 300-P, the trigger type for the pre-emptive BSR to be used by the child node 300-C. Then, the parent node 300-P transmits, to the child node 300-C, the trigger type configured by the donor node 200 for the child node 300-C. The child node 300-C triggers the pre-emptive BSR in accordance with the trigger type received from the parent node 300-P.

Figure 20:
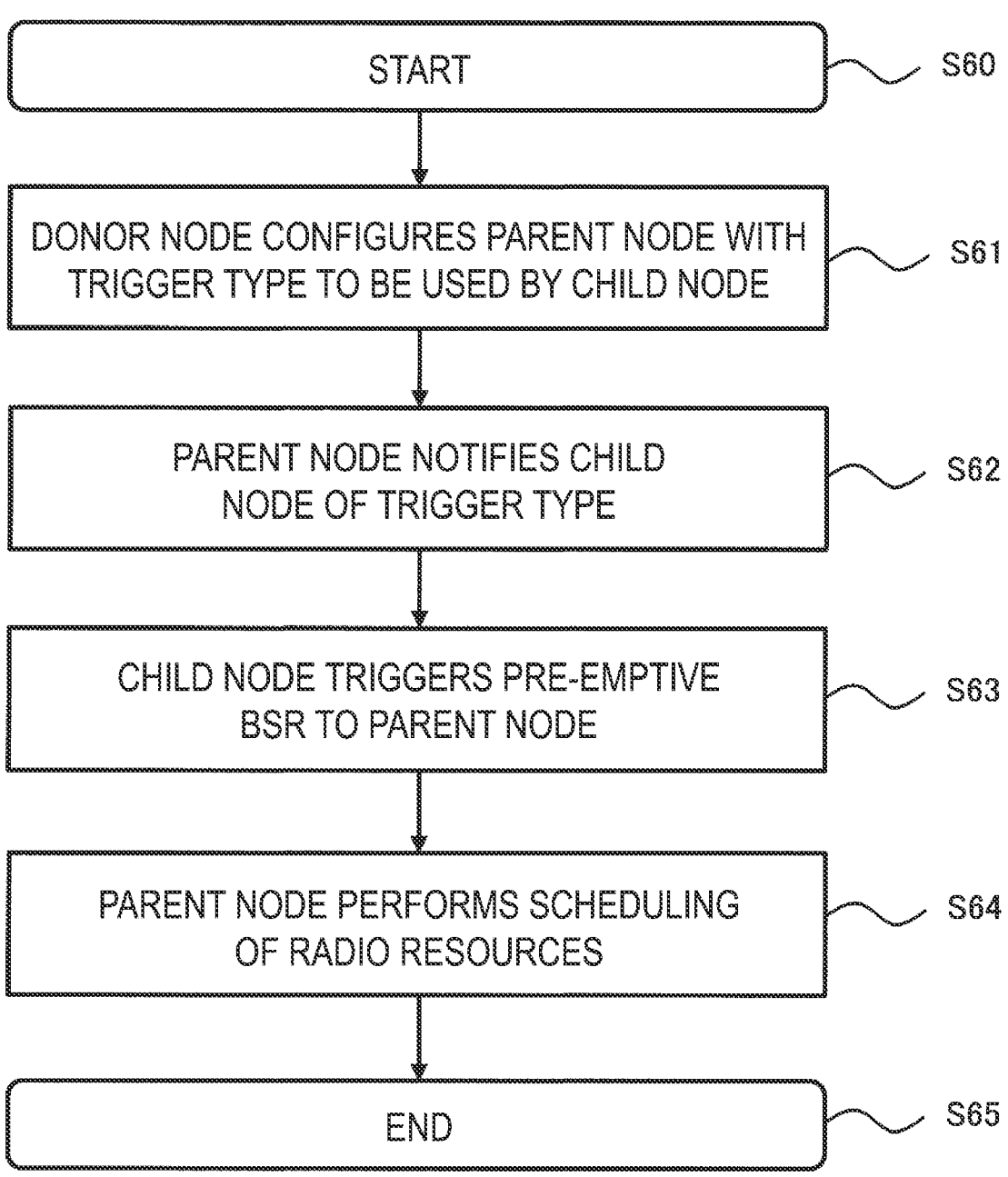
FIG. 20 is a diagram illustrating an operation example according to the fourth embodiment.

FIG. 20 is a flowchart illustrating an operation example according to the fourth embodiment.

In step S60, the donor node 200 starts processing.

In step S61, the donor node 200 configures, for the parent node 300-P, the trigger type to be used by the child node 300-C. The trigger type is configured by using the RRC message or the F1AP message, or using the BAP Control PDU or the MAC CE. In step S61, the parent node 300-P may transmit, to the donor node 200, the trigger type (or preference information) to be used by child node 300-C. In this case, the donor node 200 configures the trigger type for the parent node 300-P in response to the reception of the trigger type. Note that the configuration of the trigger type for the parent node 300-P by the donor node 200 may be replaced with the variation of the second embodiment. In other words, the donor node 200 may configure the parent node 300-P with permission to decide the trigger type for the child node 300-C. In this case, the parent node 300-P receives the permission configuration and transmits the trigger type to the child node 300-C. The configuration of the trigger type for the parent node 300-P by the donor node 200 may be replaced with the variation of the third embodiment. In other words, the donor node 200 may configure the parent node 300-P with permission for the child node 300-C itself to decide the trigger type. In this case, the parent node 300-P receives the permission configuration and notifies the child node 300-C of the permission for the child node 300-C itself to decide the trigger type, and the child node 300-C receives the notification and decides the trigger type by itself.

In step S62, the parent node 300-P transmits the trigger type for the pre-emptive BSR to the child node 300-C. The trigger type may be transmitted by using the MAC CE or the BAP Control PDU. Note that the child node 300-C, having received the trigger type, may transmit a response indicating acceptance or rejection to the parent node 300-P, as in step S21 (FIG. 14) of the second embodiment.

In step S63, the child node 300-C transmits the pre-emptive BSR to the parent node 300-P in accordance with the trigger type received from the parent node 300-P.

In Step S64, the parent node 300-P performs scheduling based on the trigger type configured by the donor node 200 and the pre-emptive BSR received from the child node 300-C. The parent node 300-P transmits the UL grant to the child node 300-C.

In step S65, the parent node 300-P terminates the series of processing operations.

Fifth Embodiment

A fifth embodiment is an example in which the trigger type is transmitted to all the IAB nodes 300 included in the entire topology constructed by the donor node 200. Specifically, first, the donor base station (for example, the donor node 200) with a plurality of relay nodes as lower nodes of the donor base station transmits the trigger type for the pre-emptive BSR to the first relay node (for example, the IAB node 300-1) immediately lower than the donor base station, the first relay node transmits the trigger type to the second relay node (for example, the IAB node 300-2) being a child node of the first relay node, and these operations are repeated for all of the plurality of relay nodes being lower nodes of the donor base station. Second, all of the plurality of relay nodes trigger the pre-emptive BSR in accordance with the trigger type.

Figure 21:
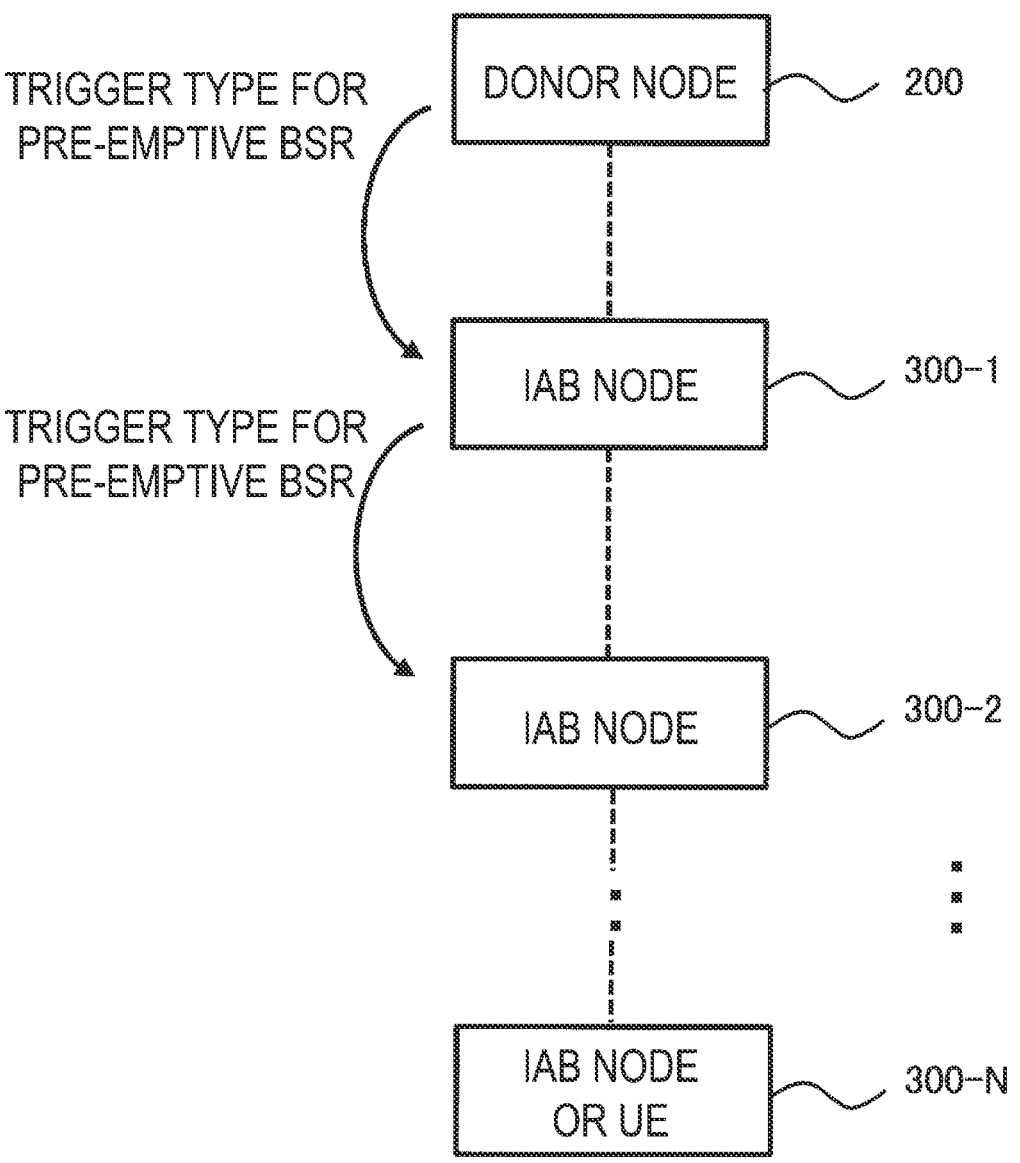
FIG. 21 is a diagram illustrating a configuration example according to a fifth embodiment.

FIG. 21 is a diagram illustrating a configuration example according to the fifth embodiment. FIG. 21 illustrates an example in which one IAB node 300 is connected to the donor node 200 and one IAB node 300-2 is connected to the IAB node 300-1. However, a plurality of IAB nodes 300 may be connected immediately lower than the donor node 200, or a plurality of IAB nodes 300 may be connected as child nodes of the IAB node 300-1. In this way, a plurality of IAB nodes may be connected immediately lower than the donor node 200 and each IAB node 300. Note that in the topology constructed by the donor node 200, the node arranged on the farthest side from the network may be the IAB node or the UE 100.

FIG. 22 is a flowchart illustrating an operation example according to the fifth embodiment. The operation example in FIG. 22 will be described with reference to FIG. 21 as appropriate.

In step S70, the donor node 200 starts processing.

In step S71, the donor node 200 transmits the trigger type for the pre-emptive BSR to the IAB node 300-1 immediately lower than the donor node 200. The trigger type may be transmitted by using the RRC message or the F1AP message. Alternatively, the trigger type may be transmitted by using the MAC CE or the BAP PDU Control.

In step S72, the IAB node 300-1 transmits the trigger type received from the donor node 200 to the IAB node 300-2 that is a child node of the IAB node 300-1. The trigger type may be transmitted by using the MAC CE or the BAP Control PDU.

In step S73, the IAB node 300-2 transmits the trigger type received from the IAB node 300-1 to the IAB node 300-3 that is a child node of the IAB node 300-2.

Subsequently, all the IAB nodes 300 lower than the donor node 200 repeat this process.

In step S74, each IAB node 300 or the UE 100 triggers the pre-emptive BSR to the donor node 200 or the parent node 300 in accordance with the received trigger type.

In step S75, the donor node 200 or the parent node 300 performs scheduling based on the transmitted trigger type and the received pre-emptive BSR, and transmits the UL grant to the child node 300 or the UE 100.

In step S76, the donor node 200 or the parent node 300 terminates the series of processing operations.

In the fifth embodiment, all the IAB nodes 300 in the topology or the UE 100 can transmit the pre-emptive BSR in accordance with the same trigger type. Thus, also in the fifth embodiment, as in the first embodiment and the like, the parent node 300 or the donor node 200 can transmit the appropriate UL grant to the child node 300 or the UE 100 at the appropriate timing.

OTHER EMBODIMENTS

A program causing a computer to execute each type of processing performed by the UE 100, the gNB 200, or the IAB node 300 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing each type of processing to be performed by the UE 100, the gNB 200, or the IAB node 300 may be integrated, and at least part of the UE 100, the gNB 200, or the IAB node 300 may be configured as a semiconductor integrated circuit (a chipset or an SoC).

Although embodiments have been described in detail with reference to the drawings, a specific configuration is not limited to those described above, and various design modifications and the like can be made without departing from the scope of the present disclosure. All of or a part of the examples can be combined together as long as the combination remains consistent.

SUPPLEMENTARY NOTE

Multi-Hop Latency
IL-2
IL-2 is defined as follows.
IL-2: Due to the current (Rel-16) limitation on the number of LCGs, an IAB node may need to report the joint buffer status of LCHs with significantly different QoS requirements.

Possible solutions for IL-2 are as follows.
L4: A new operation or function is defined for the IAB node.
L4-3: The number of LCGs of IAB-MT is increased.

In Rel-16, the number of LCGs of the UE is reused in the IAB-MT. In other words, up to eight LCGs are provided. Considering that many LCHs are configured for BH links, IAB nodes need to report the legacy BSR and the pre-emptive BSR with a limitation on the LCG. Therefore, an expanded LCG space reduces the number of LCHs aggregated in each $LCG_i$ leading to an expected increase in granularity of scheduling and expected improvement in fairness of the entire topology. Accordingly, RAN2 needs to increase the number of LCGs. This can be applied to both the legacy BSR and the pre-emptive BSR.

Proposal 1: RAN2 needs to agree on increasing the number of LCGs in the BSR and the pre-emptive BSR. Thus, L4-3 is used to resolve IL-2.
IL-3
IL-3 is defined as follows.
IL-3: Calculation of the buffer size of the pre-emptive BSR depends on the implementation in Rel-16 and may thus vary from vendor to vendor.

Possible solutions for IL-3 are as follows.
L4: A new operation or function is defined for the IAB node.

L4-1: Calculation of the buffer size of the pre-emptive BSR is defined.

For the known BSR, calculation of the buffer size is clearly defined. This is based on data available in the MAC, RLC and PDCP. In the RLC and PDCP, the procedure of calculating the data amount is defined in each specification. In Rel-16, these mechanisms are reused for calculation of the data amount of the pre-emptive BSR of the IAB-MT.

However, the IAB node includes a BAP layer instead of the PDCP, and the BAP specification does not involve the calculation of the data amount. Accordingly, according to the current specifications, an insufficient amount of data is available for transmission. For better scheduling of topology-wide fairness, a more accurate buffer size needs to be reported in the legacy BSR.

Observation 1: No procedure is available for data that can be transmitted in the BAP, and thus, the legacy BSR and the pre-emptive BSR are inaccurate.

In Rel-16, the calculation of the buffer size of the pre-emptive BSR largely depends on the implementation of the IAB-DU. On the other hand, this specification roughly discloses a guideline indicating that "a buffer size field identifies the amount of data predicted to arrive at the IAB-MT of a node for which the pre-emptive BSR is triggered, and does not include the amount of currently available data". As pointed out in the specifications, some IAB nodes may report, in the pre-emptive BSR, a buffer size larger than an actually arriving size. Using the same principle for the child node and the parent node may be difficult. For example, multi-vendor deployment leads to inefficient radio resource allocation and scheduling delays at the parent node and unfair resource requests among the IAB-MTs. As described in the specifications, a dual connectivity configuration of the IAB node may lead to higher ambiguity. Therefore, calculation of the buffer size of the pre-emptive BSR needs to be more accurately defined. A problem is that calculation of the buffer size is not defined for the IAB-DU. In other words, no definition is available for data buffered on the reception side of the IAB-DU (MAC and RLC).

Observation 2: No procedure is available for the data buffered in the MAC and RLC receivers of the IAB-DU, and the data amount reported in the Rel-16 pre-emptive BSR depends on the implementation of the IAB-DU.

Proposal 3: RAN2 should agree to define the buffer size calculation for the preemptive BSR (and possibly for the legacy BSR), i.e., to take L4-1 to resolve IL-3.

Another problem is that when the pre-emptive BSR is triggered is unclear from the point of view of the parent node. The MAC specifications describe the following two conditions. In other words, the trigger conditions depend on the implementation of the IAB-MT in Rel-16. In other words, the timing at which the parent node side is ready for data transmission fails to be accurately predicted, leading to an inappropriate UL grant.

When the configuration has been performed, and one of the following events occurs, the pre-emptive BSR may be triggered in a particular case for the IAB-MT.

The UL grant is provided to the child IAB node or the UE.
The BSR is received from the child IAB node or the UE.

A simple solution is also conceivable in which a configuration is provided indicating whether the IAB node triggers the BSR in response to UL grant transmission or BSR reception. Although the IAB donor providing the configuration is straightforward, in practice, the IAB-DU that is the parent of the IAB donor, i.e., a scheduler, uses the pre-emptive BSR. In other words, at this point, whether the IAB donor or the parent IAB node configures the trigger conditions needs to be further studied.

Proposal 4: RAN2 needs to agree that the IAB node configures the trigger used for the pre-emptive BSR. Whether the IAB donor or the IAB node that is the parent of the IAB donor performs the configuration needs to be further studied.

IL-5 and IL-6

IL-5 is defined as follows.

IL-5: The CU cannot place a bearer with a low PDB in a path with low congestion risk (high resource efficiency) or a path without RLF.

Possible solutions to IL-5 are as follows.

L3: Introduction of additional signaling from the IAB node to the CU.

L3-1: The status of the buffer/link of the IAB node is shared with the CU.

L3-2: Delay measurements per hop for each BH RLC channel are shared with the CU.

L4: A new operation or function is defined for the IAB node.

L4-2: Local rerouting is permitted for a purpose other than RLF (e.g., based on a delay in an outgoing link).

F4: Additional signaling from the IAB node to the CU is introduced.

F4-1: A solution related to load information for each BH RLC channel.

F4-2: A solution related to delay for each hop of the individual link and packet loss for each hop.

IL-6 is defined as follows.

IL-6: The CU cannot configure routing based on actual (real-time) latency for each BH RLC channel.

Possible solutions to IL-6 are as follows.

L3: Additional signaling from the IAB node to the CU is introduced.

L3-2: Delay measurements per hop for each BH RLC channel are shared with the CU.

F4: Additional signaling from the IAB node to the CU is introduced.

F4-2: A solution related to delay for each hop of the individual link and packet loss for each hop.

L4: A new operation or function is defined for the IAB node.

L4-2: Local rerouting is permitted for a purpose other than RLF (e.g., based on a delay in an outgoing link).

The IL-5 and IL-6 solutions may be common in an additional signal from the IAB node to the IAB donor. In other words, the solutions can be considered as a kind of SON procedure pointed out in the MDT to enable centralized optimization.

For L3-1, the current specifications may suggest that the IAB node can share the status of the buffer/link with the IAB donor to some degree. For example, the share is possible based on the RESOURCE STATUS UPDATE of the F1-AP and/or the measurement reporting framework of RRC. Accordingly, what kind of additional report is required for the share is unknown.

L3-2 and F4-2 are solutions that can be used in common with IL-5 and IL-6, and can be considered the same in terms of latency measurement. In the existing L2 measurement, "UL PDCP Packet Average Delay per DRB per UE" is defined, but the PDCP Packet Average Delay being inapplicable to the IAB node is clear. Accordingly, new L2 measurement in consideration of at least the BAP is predicted to be necessary.

Proposal 3: RAN2 needs to agree that the IAB node reports the results of delay measurements per hop to the IAB donor, i.e., takes L3-2 to resolve IL-5 and IL-6.

With respect to L4-2, RAN2 has already agreed that "an indication of Type-2 RLF can be used as a trigger for local rerouting" and "local rerouting can be triggered by an indication of hop-by-hop flow control". Thus, there is no need for further discussion on this topic. In other words, the details of local rerouting can be discussed on other topics for topology adaptation enhancement.

Observation 3: Another purpose, i.e., local rerouting for L4-2, will be described in the section of enhanced topology adaptation.

Congestion Mitigation

IC-1 and IC-7

IC-1 and IC-7 are defined with the following remarks.

R2 has determined that each company has a sufficiently high interest in the following two problems.

IC-1: A long period of downstream congestion on a single link cannot be mitigated using the existing Rel-16 DL HbH flow the control mechanism without relying on packet dropping.

IC-7: The CU cannot update a congested path (because the CU does not know the local congestion status).

IC-1 and CI-7 are both associated with RAN3. RAN3 is also addressing IC-1 and CI-7, and thus, how far R2 works on these issues is currently unknown.

RAN3 has discussed congestion indication and agreed as follows.

CP-based congestion indication may include broadcasting.

Per BAP routing ID, and/or

Per child link, and/or

BH RLC CH ID (Down Selection is FFS)

The CP-based congestion indication reuses the F1AP GNB-DU status indication procedure. The CP-based congestion indication is related to DL congestion.

For an UP-based approach for IAB congestion mitigation, the following two options are considered.

Enhancements are not employed

Packet marking based approach

It is assumed that, upon receiving a congestion indication from the IAB node, the IAB donor can avoid the congested path, as implied in the RAN2 agreement described above. In other words, two methods may be assumed the IAB donor updates the routing configuration or indicates local rerouting. In the latter case, RAN2 may be involved in the usage of the congestion indication. In any case, at this point, the RAN2 should wait for the progress in RAN3.

Observation 4: after RAN3 grasps the details, RAN2 may be involved in what action the IAB donor takes in response to the congestion indication.

The invention claimed is:

1. A communication control method used in a cellular communication system, the communication control method comprising:

transmitting, by a first relay node being a child node of a second relay node, a trigger type for a pre-emptive buffer status report (pre-emptive BSR) to the second relay node, wherein the trigger type indicates a condition for triggering the pre-emptive BSR transmission;

triggering, by the first relay node, the pre-emptive BSR to the second relay node in accordance with the trigger type; and transmitting, by the first relay node, the triggered pre-emptive BSR to the second relay node.

2. The communication control method according to claim 1, further comprising configuring, by a donor base station with the first relay node and the second relay node as lower nodes of the donor base station, the first relay node with a configuration of permitting the first relay node to decide the trigger type, wherein the transmitting of the trigger type comprises transmitting, by the first relay node where the configuration has been configured, the trigger type to the second relay node.

3. A communication control method used in a cellular communication system, the communication control method comprising:

transmitting, by a donor base station with a plurality of relay nodes as lower nodes of the donor base station, a trigger type for a pre-emptive buffer status report (pre-emptive BSR) to a first relay node immediately lower than the donor base station, wherein the trigger type indicates a condition for triggering the pre-emptive BSR transmission, transmitting, by the first relay node, the trigger type to a second relay node being a child node of the first relay node, and repeating the transmitting of the trigger type to the first relay node and the transmitting of the trigger type to the second relay node for all of the plurality of relay nodes being lower nodes of the donor base station;

triggering, by each of the all of the plurality of relay nodes, the pre-emptive BSR in accordance with the trigger type; and transmitting, by each of the all of the plurality of relay nodes, the triggered pre-emptive BSR.

4. A first relay node that is a child node of a second relay node, the first relay node comprising:

a transmitter configured to transmit a trigger type for a pre-emptive buffer status report (pre-emptive BSR) to the second relay node, wherein the trigger type indicates a condition for triggering the pre-emptive BSR transmission, and a controller configured to trigger the pre-emptive BSR to the second relay node in accordance with the trigger type, wherein the transmitter transmits the triggered pre-emptive BSR to the second relay node.

\* \* \* \* \*